(12) United States Patent
Gupta et al.

(10) Patent No.: US 7,533,107 B2
(45) Date of Patent: May 12, 2009

(54) DATA SOURCE INTEGRATION SYSTEM AND METHOD

(75) Inventors: Amarnath Gupta, San Diego, CA (US); Bertram Ludaescher, San Diego, CA (US); Maryann E. Martone, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 192 days.

(21) Appl. No.: 10/363,615

(22) PCT Filed: Sep. 7, 2001

(86) PCT No.: PCT/US01/27653

§ 371 (c)(1), (2), (4) Date: May 12, 2003

(87) PCT Pub. No.: WO02/21259

PCT Pub. Date: Mar. 14, 2002

(65) Prior Publication Data

US 2004/0034651 A1    Feb. 19, 2004

Related U.S. Application Data

(60) Provisional application No. 60/231,094, filed on Sep. 8, 2000.

(51) Int. Cl.
G06F 17/00 (2006.01)

(52) U.S. Cl. .................. 707/101; 707/100; 707/102; 707/1

(58) Field of Classification Search .......... None
See application file for complete search history.

(56) References Cited

U.S. PATENT DOCUMENTS

| 5,956,720 | A | 9/1999 | Fernandez et al. |
| 5,995,959 | A | 11/1999 | Friedman et al. |
| 5,995,961 | A | 11/1999 | Levy et al. |
| 6,134,559 | A | 10/2000 | Brumme et al. |
| 6,697,824 | B1* | 2/2004 | Bowman-Amuah ......... 709/229 |
| 2003/0084017 | A1* | 5/2003 | Ordille ........................ 707/1 |

OTHER PUBLICATIONS

Bertram Ludascher, Amarnath Gupta, Maryann E. Martone, "Model-Based Mediation with Domain Maps", ICDE 2001 submitted, pp. 1-15.

Amarnath Gupta, Bertram Ludaescher, Maryanne E. Martone, "Knowledge-Based Integration of Neuroscience Data Sources", SSDBM 2000, Jun. 2000, pp. 1-14.

(Continued)

Primary Examiner—Sana Al-Hashemi
(74) Attorney, Agent, or Firm—Greer, Burns & Crain, Ltd.

(57) ABSTRACT

A method and program product for integrating different data sources has steps of obtaining semantic information from each of the different data sources (200, 202, 210), creating a conceptual model of (218, 220, 22) the data source using the semantic information, and accessing one or more secondary knowledge sources. The secondary information sources contain information regarding the relations of data from different of the databases, so that an integrated semantic model of all of the databases (200, 202, 210) may be created. Queries can then be processed using the integrated semantic model.

48 Claims, 7 Drawing Sheets

OTHER PUBLICATIONS

D. Florescu, L. Rashid, P. Valduriez, "A Methodology for Query Reformulation in CIS Using Semantic Knowledge", Intl. Journal of Cooperative Information Systems, 5(4), 1996.

C.H. Goh, S. Bressan, S.E. Madnick, and M.D. Siegel, "Context Interchange: New Features and Formalisms for the Intelligent Integration of Information", ACM Transactions on Information Systems (TOIS), 17(3), pp. 279-293, 1999.

H. Garcia-Molina, Y. Papakonstantinou, D. Quass, A. Rajaraman, Y. Sagiv, J. Ullman, V. Vassalos, and J. Widom, "The TSIMMIS Approach to Mediation: Data Models and Languages", Journal of Intelligent Information Systems, 8(2), 1997.

V. Kashyap and A. Sheth, "Semantic and Schematic Similarities Between Database Objects: A Context-Based Approach", VLDB Journal, 5(4), pp. 276-304, 1996.

W. May, R. Himmeroder, G. Lausen and B. Ludascher, "A Unified Framework for Wrapping, Mediating and Restructuring Information from the Web", Intl. Workshop on the World-Wide Web and Conceptual Modeling (WWWCM'99), LNCS 1727, Paris, France, 1999. Springer.

L. Haas, D. Kossman, E. Wimmers and J. Yang, "Optimizing Queries across Diverse Data Sources", In Proc. VLDB Conference, 1997.

D. Calvanese, G. De Giacomo, M. Lenzerini, D. Nardi and R. Rosati, "Information Integration: Conceptual Modeling and Reasoning Support", Intl. Conference on Co-operative Information Systems (CoopIS), pp. 280-291, 1998.

S. Bergamaschi, S. Castano, D. Beneventano and M. Vincini, "Semantic Integration of heterogenous information Scources", Data & Knowledge Engineering 36 (2001) 215-249.

Prasenjit Mitra, Gio Wiederhold and Jan Jannink, "Semi-Automatic Integration of Knowledge Sources", Proceedings of Fusion '99, Sunnyvale, CA, Jul. 1999.

J. Calmet, S. Jekutsch, P. Kullmann and J. Schu, "KOMET-A System for the Integration of Heterogeneous Information Sources," 10th International Symposium on Methodologies for Intelligent Systems (ISMIS), 1997.

M.Q.W. Baldonado and T. Winograd, "SenseMaker: An Information-Exploration Interface Supporting the Contextual Evaluation of a User's Interest", Proceedings of CHI 1997, Atlanta, GA.

\* cited by examiner

1. Interactive PROTein LOCalization Query
(UCSD/NCMIR data only)

*"Find the distribution of PROTEIN having ISOFORM in SPECIES and corresponding IMAGEs"*

```
SPECIES = 'chicken',
protLoc( PROTEIN, ISOFORM, SPECIES, IMAGE_ID ).
``` submit

DATA SOURCE INTEGRATION SYSTEM AND METHOD

PRIORITY CLAIM

Applicants claim priority benefits under 35 U.S.C. § 119 on the basis of Patent Application No. 60/231,094, filed Sep. 8, 2000.

STATEMENT OF GOVERNMENT INTEREST

This invention was made with Government assistance under NIH grant/contract DC03192 and NSF grant/contract 9619020. The Government has certain rights in this invention.

TECHNICAL FIELD

The present invention is related to integrating information from a plurality of different information sources. More particularly, the present invention is related to methods and computer program products for creating an integrated model that correlates information from a plurality of different heterogeneous databases.

BACKGROUND ART

Information sources such as databases, spreadsheets, tables, and the like are well known in the art. As used herein, "information sources" is intended to broadly refer to data sets that allow some form of querying, either directly or indirectly, with an example of indirect querying as through a suitable "wrapper" layer that functions as a converter or interpreter. Information source examples include, but are not limited to, tables, databases, spreadsheets, web pages with or without forms, flat files, software with API's (application program interfaces), and the like.

When interpreting such a data set, there are different levels of understanding involved. For example, any data can be viewed at the bitstream level (zeros and ones) and the character level (e.g., ASCII or Unicode). Apart from this very low, close to physical level representation of information, higher level structures like records, sets, lists, trees, graphs, etc. are employed to provide better abstractions and handles for data and information manipulation. For example, a relational database hides its physical data organization from the user and only exposes a logical view of the modeled "mini world." (every database can be seen as a representation of some aspects of the world, hence the term "mini world").

This logical view is captured in the relational database schema. This comprises, for each relation, the relation name (=table), and the names and data types of the relation's attributes (=table columns). In addition to this already high-level logical view, there is a higher "conceptual level view" on the database which is often not made available to the user, either because there does not exist a formal (machine-readable) representation of that conceptual level view, or, even if it exists, e.g., in the form of an entity relationship ("ER") or uniform modeling language ("UML") diagram, this representation may not be linked to the database query mechanism in a systematic way.

This highest conceptual level representation of databases may be characterized in a conceptual model, often in a language such as ER or UML. A conceptual model represents knowledge that is not discernable from the face of the data source. For example, a data source's conceptual model can represent implicit "domain rules" (or "domain semantics") that capture additional aspects of the source's modeled mini world.

By way of a simple example, assume a car manufacturer X is interested in answering a question of the form "which parts of the 1998 'Hector SUV' were purchased or serviced most between Jan. 1, 1999 and Dec. 31, 2000". A prior art database approach can answer such questions based on tables of the form:

| Table Sold Parts | | | | | | | | |
|---|---|---|---|---|---|---|---|---|
| Transaction ID | Customer ID | Date | Vehicle ID | Model | Year | Part No | Qty | Price |

| Table Services | | | | | | |
|---|---|---|---|---|---|---|
| Transaction ID | Customer ID | Date | Vehicle ID | Service ID | Service Description | Price |

Next, consider that car company X has a database at its production site that keeps track of the jobs performed by different machines in the shop floor. In addition to the job performed at each machine, the database keeps track of a "machine's health" by recording its service dates and errors produced by it.

This information is maintained using the following simplified schema:

| Table Jobs | | | | | | |
|---|---|---|---|---|---|---|
| Machine ID | Job ID | Date | Time | Part No | Error | Comments |

| Table Machines | | | | | | |
|---|---|---|---|---|---|---|
| Machine ID | Machine Type | Operation | Last Service | Next Service | Maximum Error | Comments |

With this schema a query such as "which parts were produced with machines whose cumulative error exceeded the maximum error before its service date, such that the date of the part production by the machine is after the date the machine exceeded the maximum error?" can be processed. The query result will represent "defective parts" that might have been produced by "defective machines".

However, these two data sources, even if integrated, may not be useful in processing other queries. For example, consider queries directed to determining whether the defective parts produced by defective machines have any relationship with the parts that are purchased or serviced most in the parts shops. At a first glance it may appear that the two information sources could be joined with reference to their part numbers to process such queries. Such an approach, however, will produce only incomplete results. In particular, only those parts that were both defective and were serviced or purchased would be identified. Intuitively, this result is incomplete in that a specific defective part, say in the transmission, may not need any service at all but may instead cause other parts it interacts with to require service/replacement.

These example car-related data source and queries are fairly simple. Data sources may be much more complex, depending on the complexity of the mini-world they represent. Also, sophisticated data sources often have sophisticated query capabilities. Such sophisticated data sources may be found in the area of biological research, for example, where a genomic database may have the ability to search large amounts of genomic data to report similar gene sequences using complex and specialized string matching algorithms. As another example, macromolecular databases compare the 3D structure of molecules to determine their possible structural relationships.

As databases and other data sources have become more powerful and widely used, users are often faced with the task of obtaining information from a plurality of sources. Once again referring to the art of biological research by way of example, a biologist may assess different animal models to study different aspects of the same biological function. Thus, a biologist may wish to integrate, for instance, information from a first database regarding the brain from a rodent, from a second database regarding the brain from a primate, and from a third database regarding portions of primate and rodent brains that deal with vision. All three of these databases may have been created at different times by different researchers using different models (or the may in fact come from one common database/design process as in the car manufacturer example above). In particular, each individual database may have different semantics resulting in different structures, and have different query capabilities. As a result, there are numerous difficulties associated with attempting to universally query the databases.

Solutions to these difficulties have been proposed. For example, so called "mediator systems" have been offered to integrate data from different data sources. FIG. 1 is a schematic generally illustrating a prior art mediator system architecture. The mediator generally accesses data from the various databases by means of "wrappers" which sit "on top" of the sources and create a uniform access mechanism to them. The wrappers generally export data from the database in a common, often so-called "semistructured" language, so that any data (whether it is very structured like data from databases, or whether it is less structured such as certain HTML documents) from the various sources can be presented to the mediator in a uniform data language. A prominent semistructured data language is the Extensible Markup Language XML.

The user query is generally translated by the mediator into an XML query when issuing requests downwards, and XML result elements when sending back data upwards. The wrapper layer at each database translates the incoming XML query into a language native to the database query capabilities. Results obtained from each database may then be conveyed to the mediator in XML and presented through the user interface to the user.

For more information regarding mediator systems, reference may be made to D. Florescu, L. Rashid, and P. Valduriez, "A Methodology for Query Reformulation in CIS Using Semantic Knowledge", Intl. Journal of Cooperative Information Systems, vol.5, no. 4, pp. 431-468, 1996, World Scientific Company; H. Garcia-Molina, Y. Papakonstantinou, D. Quass, A. Rajaraman, Y. Sagiv, J. Ullman, V. Vassalos, and J. Widom, "The TSIMMIS Approach to Mediation: Data Models and Languages", Journal of Intelligent Information Systems, vol. 8, no. 2, 1997, Kluwer Academic Publishers; V. Kashyap and A. Sheth, "Semantic and Schematic Similarities between Database Objects: A Context-based Approach", VLDB Journal, vol. 5, no. 4, pp. 276-304, 1996, VLDB Endowment, Saratoga, Calif.; and Springer-Verlag; L. Haas and D. Kossman and E. Wimmers and J. Yang, "Optimizing Queries across Diverse Data Sources", In Proc. International Conference on Very large Databases, Athens, Greece, pp. 276-285, 1997, VLDB Endowment, Saratoga, Calif.

Such prior art systems have proven useful when combining different data sources whose relevant (for the integration) classes, or "inter-source couplings" ("ISC"s) are more or less evident from the native source schema. For example, common, similar, or very closely related attribute names may indicate "joinable" columns—a very common ISC (e.g., the above relational database schemas, where "part number" may provide a relevant ISC). By way of further example, mediator systems as known have proven useful for applications such as comparison shopping for a particular appliance model on the world wide web where different vendors may use databases that have different structures, yet whose semantics make it fairly simple to integrate the sources to process a query using simple ISC's. In this example, it is straightforward to search for the appliance model number in the different databases and combine data from several databases into a single set.

For more complex integrations, however, prior art systems have achieved only limited usefulness. For example, different data sources may be difficult or impossible to integrate with systems and methods of the prior art if the data sources have relations that are not "apparent" to the mediator tool and that have not been encoded in them.

For these and other reasons, unresolved needs in the art exist.

DISCLOSURE OF THE INVENTION

The present invention is directed to integration methods and computer program products for integrating data from a plurality of data sources. In particular, the present invention is directed to methods and computer programs that integrate semantic information from the plurality of data sources into an integrated semantic model. A method of the present invention has general steps of obtaining semantic information from each of a plurality of different data sources and creating a conceptual model of the data source that expresses the semantic information. An additional step comprises accessing one or more secondary knowledge sources having knowledge that relates the data from different data sources. An integrated semantic model of the plurality of data sources is then created in an additional method step using the conceptual models of each of the plurality of data sources and the secondary knowledge source. Preferably, the integrated semantic model comprises logic statements that relate classes from different of the data sources.

It will be appreciated that embodiments of the present invention lend themselves well to practice in the form of computer program products. Accordingly, embodiments of the invention comprise computer programs having computer readable instructions that when executed cause a computer to perform steps of methods of the invention.

The present invention thereby solves many of the heretofore unresolved problems in the art in an elegant and novel manner. By way of example, in the context of the car-company examples presented above, queries such as "which defective parts produced by defective machines have any relationship with the parts that are purchased or serviced most in the parts shops?" were difficult to evaluate with methods of the prior art. To accurately process such a query, it is necessary to have, in addition to the given information source tables, secondary knowledge that bridges the gap between the sources. In particular, relevant secondary knowledge in this example may comprise a set of auxiliary facts and rules about how one part of a car relates to and can impact another part. These secondary knowledge facts and rules can be represented in a formal, machine-readable way, with a preferred example comprising a labeled graph-structure representing logic relations.

The above brief description sets forth broadly some of the features and advantages of the present disclosure so that the detailed description that follows may be better understood, and so that the present contributions to the art may be better appreciated. There are, of course, additional features of the disclosure that will be described hereinafter that form the subject matter of the claims appended hereto. In this respect, before explaining embodiments of the disclosure in detail, it is to be understood that the disclosure is not limited in its application to the details of the construction set forth in the following description or illustrated in the drawings. The present invention may provide additional embodiments, as will be appreciated by those knowledgeable in the art. Also, it is to be understood that the phraseology and terminology employed herein are for description and not limitation.

BEST MODE OF CARRYING OUT THE INVENTION

It will be appreciated that the present invention is well suited for practice in the form of computer program products as well as methods. Accordingly, invention embodiments comprise methods as well as computer programs. Indeed, it will be understood by those knowledgeable in the art that method embodiments may be closely related to computer program embodiments in that methods carried out by a computer may comprise computer programs. Therefore, while discussion herein may make reference to one of either a method embodiment or a computer program embodiment, it will be understood that the discussion may be likewise applicable to the other of a method or computer program embodiment.

In the case of computer program product embodiments, the computer programs comprise computer executable instructions stored in a computer readable medium that when executed cause a computer to execute steps. Those knowledgeable in the art will appreciate that a computer readable medium may comprise any of a wide variety of mediums including, but not limited to, magnetic and optical media such as disks and the like, electrical conductor devices, circuitry and micro-circuitry, and the like. Also, it will be appreciated that the term "computer" as used herein is intended to broadly refer to any processor-based device capable of processing computer readable instructions, and by way of example includes, but is not limited to, desktop processor devices, portable processor devices, network based processor devices, and the like.

Figure 1:
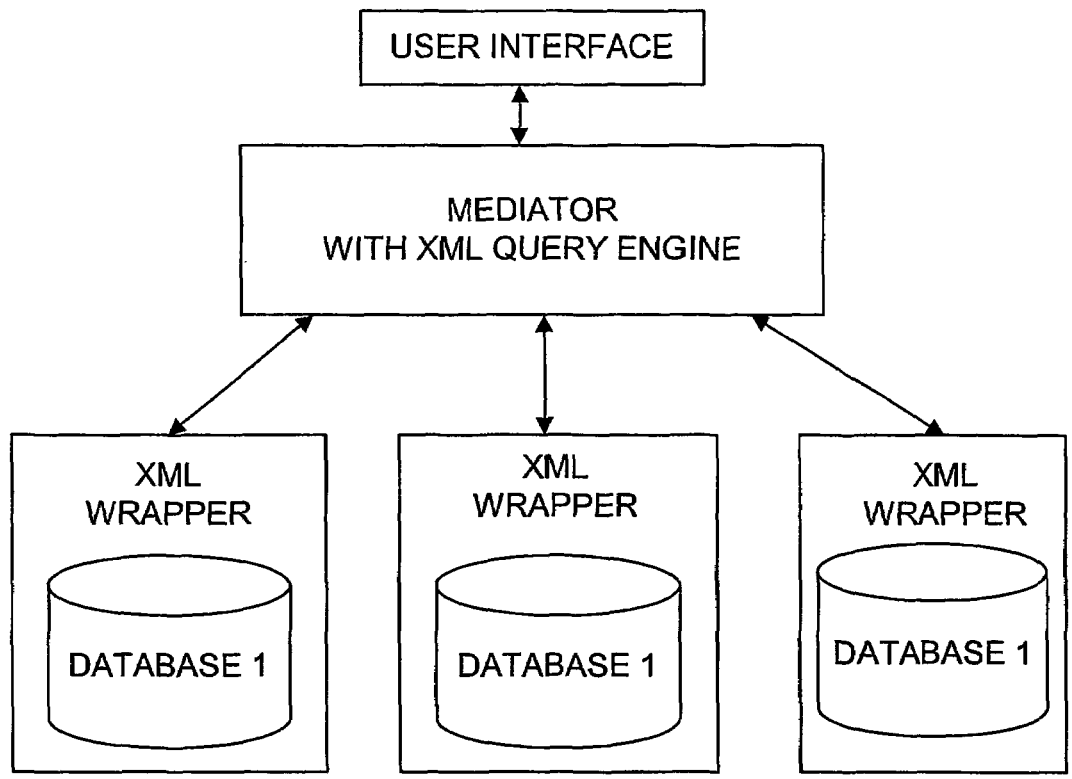
FIG. 1 is a schematic diagram of a mediator system of the prior art.
Figure 2:
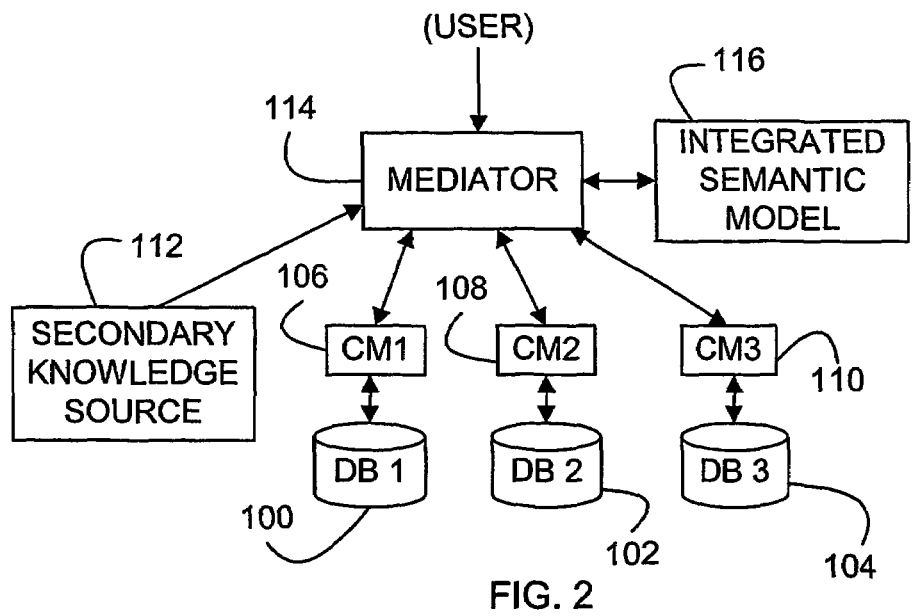
FIG. 2 is a schematic diagram illustrating in general the architecture of a program product embodiment of the invention.

FIG. 2 is a schematic useful in describing in general an embodiment of a method and program product of the invention. In general, a method embodiment of the invention comprises obtaining semantic information from each of a plurality of different data sources 100-104, and creating corresponding conceptual models (CM) 106-110 that model the semantic information of the respective data sources. As used herein, the term "semantic information" as used with data sources is intended to broadly refer to the characterization of constraints that hold for subsets of data and of relationships that hold between data. For example, "semantic information" as used herein is intended to refer to groupings that may be present within data elements, relative numerosity of different categories of data items, rules that a set of data elements must always abide by, or the like. By way of further definition, "semantic information" as used herein may express the properties of data that have not been explicitly encoded in the alphanumeric representation of the data or in the syntactic structure that holds together different data elements.

Those knowledgeable in the art will appreciate that semantic information may be obtained in any of a variety of particular steps. For example, for a digital source such as a relational database, semantic information such as constraints and uniqueness of values may be obtained from the "system catalog". Also, it may be possible to infer semantic information by inspecting the structural relationship among data elements. For example, it may be possible to partly infer the semantic information for a data source that has an additional "document model" enumerating the "tags" into which the document producer has categorized the data. By way of additional example, semantic information may be obtained through personal inspection or observation of a data source. That is, often semantic information is apparent to a learned data source reader or observer through personal knowledge of the domain that gives rise to the data. Other particular methods of "obtaining" semantic information will be apparent to those knowledgeable in the art.

Also, as will be appreciated by those knowledgeable in the art, the term "conceptual model" as used herein is intended to broadly refer to a model for expressing conceptual level semantic information of a data source that is not available on the face of the data source. By way of particular example, a conceptual model may be expressed by an (E)ER diagram, a UML class diagram, or by a Resource Description Framework (RDF).

Method and program product embodiments of the invention further comprise accessing a secondary knowledge source 112 that has information relating at least some of the data sources 100-104 to one another. The term "secondary knowledge" as used herein is intended to refer to information such as facts, constraints, rules, or the like that relate data from the data sources 100-104 to one another. The secondary knowledge source 112 may be thought of as a semantic "roadmap" that connects the seemingly unrelated data of the various data sources 100-104 to one another. A secondary knowledge source 112, by way of example, may comprise expert knowledge or a digital data file that can relate data from one or more of the data sources 100-104 to data from other of the data sources 100-104 by logical "is a", "has a", "part of", "connected to", or the like relations (e.g., B "is a" C, B "has a" D, D "is a part of" E, etc.).

Several of these logical relations may also express their properties through rules. For example, a logic rule may state that for a specific domain, a "has a" or a "part-of" relation is irreflexive, anti-symmetric, and transitive. Similarly, the secondary knowledge source may also specify rules that state joint properties of multiple relations. For example, a rule demonstrating the interplay of "is a" and "has a" relations may be: "If A is a B, and B has a C, then infer that A has a C". Similarly, there may be several different types of "has a" relationships that may or may not be interrelated as specified by rules. Using the secondary knowledge source 112 and the conceptual models 106-110, a mediator 114 creates an integrated semantic model 116 that provides a single, "integrated semantic model" of the data from the different data sources to a user.

The term "semantic model" is intended to broadly refer to a conceptual level model that expresses the semantics of the underlying object being modeled. Further, the term "integrated semantic model" as used herein is intended to broadly refer to a conceptual level model that relates data from different sources. An integrated semantic model may also be referred to herein as a domain map. In either case, the integrated semantic model Further, application of a query against the integrated semantic model or the domain map may result in identification of data relevant to the query. This set of relevant data may be referred to herein as an integrated view or an integrated view definition.

Figure 3:
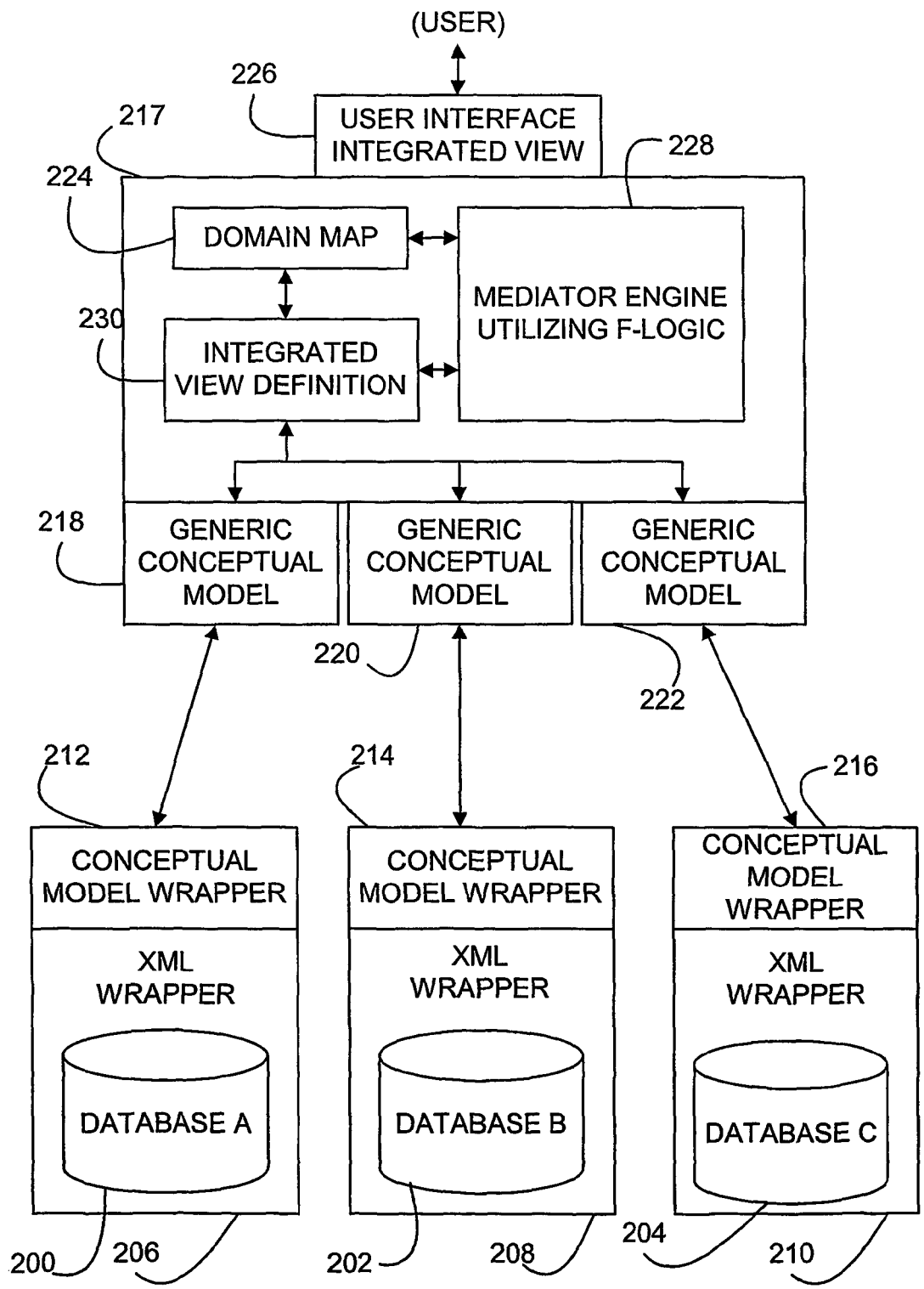
FIG. 3 is a schematic diagram illustrating the architecture of a second program product embodiment of the invention.

With the relatively straightforward discussion of the invention embodiments as illustrated by FIG. 2 complete, the more detailed invention embodiment of FIG. 3 may be discussed. The schematic of FIG. 3 illustrates the architecture of a preferred computer program product of the present invention. In this architecture, a plurality of different databases 200-204 are to be integrated for processing one or more queries. To accomplish this integration, the program product obtains data from the databases in a semistructured representation. As used herein, the term "semistructured" is intended to refer to a unified data representation comprising instance (i.e., data-level) and schema-level information (i.e., schema information such as "attribute name is directly represented in the data").

In semistructured data, for instance, the data may be represented by a labeled, ordered tree or by a labeled, directed graph where nodes of the structure represent the actual data, and the labels of the edges represent the "descriptor" of the data at the end of the edge. By way of example, an XML document can be considered to be "semistructured" data. A relational table may also be captured in a semistructured representation. For example, a portion of the data in the Table named Jobs from the earlier example is represented as:

| Machine ID | Job ID | Date | Time | Part No | Error | Comments |
|---|---|---|---|---|---|---|
| 1234 | 109 | Jan. 2, 1998 | 13:42 | 82-53 | 0.02 | OK |

In a semistructured representation using XML the same information can appear as:

```
<jobs>
    <job job_ID="109">
        <machine_ID>1234</>
        <date>
            <month>1</>
            <day>2</>
            <year>98</>
        </date>
        <time>13:42</>
        <part_no>82-53</>
        <error>0.02</>
        <comments>OK</>
    </job>
</jobs>
```

Since the flexibility of semistructured representation can encode many different data models, it is preferred that the data sources export their information to the integration unit (i.e., the mediator 217) in XML. The task of converting the data from the data source's native representation to XML is performed by software modules schematically described as "XML wrappers" 206-210 in FIG. 3.

In addition to wrapping data in the semistructured XML form, a computer program embodiment also obtains semantic information that may comprise class structure (e.g., a class hierarchy or a class lattice), relationship schema, semantic rules, and the like from the databases to create a conceptual model for each database. Indeed, an important aspect of the present invention is that conceptual models themselves can be exported to the mediator 217. Conceptual models are conveyed using software modules 212-216 referred to as the conceptual model wrappers (CMWs). The task of the CMW's 212-216 is to convert the conceptual model from the data source's formalism (e.g., EER or UML) to a uniform and consistent formalism.

The semantic information that comprises the conceptual model is conveyed by registering CMW's 212-216 with a mediator 217. Registration requires that each CMW 212-216 convey semantic information such as class schema, relationship schema, semantics rules, and the like to an interface layer at the mediator in a language that the mediator 217 can interpret and operate with. At this mediator interface layer, the generic conceptual models ("GCM's") 218-222 will be created in the consistent and uniform language.

Preferably, the GCM's 218-222 are object oriented models that comprise first order logic declarations, and most preferably have the form of frame logic ("F-logic"). Those knowledgeable in the art will recognize that many suitable equivalents for practice with the invention are available in addition to F-logic, including but not limited to Datalog and Prolog. Those knowledgeable in the art will also appreciate that representing the GCM in F-logic imparts well founded semantics to the logic rules. The principles of well-founded semantics can be appreciated by any one knowledgeable in the art of logic programming. The use of first order logic naturally enables the GCM to express functionalities such as cardinality constraints, range constraints, inclusion dependencies, and the like; as well as useful inductive constraints such as transitivity of the class hierarchy, and the like, when using well-founded or similar fixpoint based semantics.

The logic statements of the GCM's 218-222 may express declarations of at least instance, subclass, method, and relation. An instance (X, C) specifies that the object named X is an instance of class C. With reference to the auto company X example presented above, "part 389" is an instance of the class "Parts". A subclass ($C_1$, $C_2$) specifies that $C_1$ is a subclass of $C_2$ and that instances of $C_1$ are therefore instances of $C_2$. Again by way of example, "Moving Parts" are a subclass of "Parts", and instances of the subclass "Moving Parts" such as "Piston2" are therefore instances of the class "Parts". The method (C, M, $C_M$) specifies that the method M is applicable to objects in C to yield objects in $C_M$. The method (fuel_pump, supplies, fuel_lines), for instance, specifies that for the class fuel_pump, the method "supplies" produces result of the type "fuel_lines". The relation (R, $A_1/C_1$, . . . $A_n/C_n$) specifies an n-ary relationship between objects of classes $C_1, \ldots C_n$, with $A_n$ corresponding to attributes or association roles.

In addition to these logic declarations that logically relate data from different databases, GCM's 218-222 further preferably comprise additional logic rules referred to herein as integrity constraints. The integrity constraints serve as logic "checks" to insure that information and relations deducted through the logic declarations of GCM's 218-222 are consistent. For example, assume a logic constraint φ should hold for all instances of a CM. By expressing it as the denial ψ:=¬φ (i.e., a named error has occurred if the negation ψ of φ holds). Hence if ψ can be derived for a particular CM instance, then the CM instance violates the φ and an inconsistency has been detected. Inconsistencies are tabulated as they are encountered to monitor consistency and indicate and explain inconsistency.

Query capabilities may likewise be conveyed from CMW's 212-216 to the mediator 217 for inclusion in the GCM's 218-222. A data source's query capability may be illustrated with reference to an example form used on a web page. Assume that a user can query the table named "Services". While the table has the structure:

| Transaction ID | Customer ID | Date | Vehicle ID | Service ID | Service Description | Price |
|---|---|---|---|---|---|---| the user can only access it through a form that shows the fields "Customer ID", "Date", "Vehicle ID" and "Service ID". By filling out these fields, the user can retrieve a corresponding record. In this example, the table query capabilities do not allow for the user to formulate a query such as "Find all records where the price is less than $50". However, if the source had allowed the user to ask an SQL query, this will be a very simple query to formulate. Thus, two sources with identical logical and conceptual models may have different query capabilities.

When the CMWs 212-216 convey their conceptual-level semantic information (e.g., conceptual models expressed in languages such as EER, RDF, UML, or the like, and additional rules describing the semantics of source data) to the mediator 217, they preferably do so using an XML representation, for example, a DTD for encoding EER or UML (e.g., XMI is such a language for UML). If the mediator 217 already "understands" XMI (i.e., capable of recognizing and mapping XMI constructs into equivalent GCM construct), then creation of a GCM 218-222 is straightforward. If the CMW 212-216 exports its semantic information in a language new to the mediator 217 and thereby not "known" (e.g., a new language "NCMF" that may be an alternative XML representation for UML models), then a "CM plug-in" may be provided or performed.

The ability to use "plug-ins" for registering otherwise unknown CM languages with the mediator advantageously provides for excellent extensibility of the program product architecture. Additional data sources may be readily added to the dialog regardless of their CM formalism, so long as the formalism may be converted to the GCM logic language. Once a plug-in has been provided, the mediator will be able to recognize and convert future instances of the CM representation. The preferred GCM object oriented and F-logic representation allow for the GCM's 218-222 to formalize virtually any CM formalism used. CM representations such as UML, RDF (resource description framework) or EER (extended entity relationship), for example, may be readily converted to uniform object oriented F-logic at the GCM level.

As an example of the plug-in aspect of the invention, assume the mediator 217 uses frame logic ("F-logic") as a GCM representation. In order to register with the mediator 217, a new data source using an unknown language NCMF to encode its UML conceptual model (including semantic domain constraints) has to be translated to equivalent F-logic facts and rules. Hence an NCMF-to-F-logic plug-in is provided. Formally, a plug-in is a mapping "f" from the source's CM language (here: UML in NCMF) to an equivalent representation in the GCM language (here: F-logic) of the mediator. For example, a mapping:

f: UML (here: in NCMF)→GCM (here: F-logic)

that translates any given UML class diagram (in NCMF encoding) into an equivalent F-logic representation would be such a plug-in. In this manner, the UML semantics of a source S is captured in NCMF and after applying f it is represented in the form of executable F-logic statements (rules) in a GCM. Hence the data source's ("S") semantic information (as captured in S.NCMF) can be employed for creation of a GCM for use by the mediator. The data source S may then have a GCM expressing an equivalent F-logic ("FL") representation, which may be summarized as S.FL:=f(S.NCMF).

Should the mediator need to issue a query Q against the GCM of the data source S (i.e., S.FL), the query Q may be translated into an equivalent query Q' against S.NCMF. Consider:

Q':=Q of i.e., the composition comprising an application of f (going from NCMF to GCM), followed by an application of Q (going from GCM to the result schema). Clearly this Q' achieves the desired effect. Thus, a possible, albeit probably inefficient, way of evaluating Q' is to compute the complete image of NCMF under f and then to apply Q to it. Note that this amounts to materializing, at the mediator, the semantics of S in the GCM language. An often preferable solution is to not execute f and Q in sequence but to compute the functional composition (Q o f) a priori. If such a composition is used which does not need to materialize the f image, then this often results in a more efficient Q'.

In the computer program embodiment architecture as represented by the schematic of FIG. 3, the mediator 217 contains a domain map 224 representing the integrated semantic model created through consultation with a secondary knowledge source that has information relating the individual GCM's 218-222. That is, the secondary knowledge source provides the "semantic road map" or "knowledge glue" that bridges the gap between the GCM's 218-222 that may be formalized in the domain map 224 to provides facts, rules, constraints, and the like relating the various GCM's to one another. Embodiments of integrated semantic models such as the domain map 224 thereby formalize expert knowledge that is needed to mediate across multiple world scenarios as represented by different information sources. Preferably, the domain map 224 comprises first order logic statements in the same language with those of the GCM's 218-222, and therefore preferably comprise F-logic declarations.

By way of example, the logic statements of the domain map 224 may describe relationships between members of the different databases such as instance, subclass, method, relation, and the like. By way of example, relations between classes such as "is a", "has a", "part of", "process of", "before", "happens after", "located in", "connected to", "less than", "greater than", and the like may be described. Preferably, each such logic statement has a set of logic rules that describes the properties of the statement. For example, statements may be described as transitive, reflexive, symmetric, or the like. Logic constraints, ranges, and the like may also be expressed.

By way of further example, an integrated semantic model in the form of a domain map for the car company X example presented above may specify the domain knowledge that "pouring excessive fuel through the fuel injector may reduce the fuel's ability to ignite properly". A different rule may state that "the nozzle diameter of the fuel injector, the pressure of the fuel from the fuel line, and the pulse-width of the electromagnetic energizer of the fuel injector regulate the amount of fuel delivered to the engine". The domain knowledge may also represent "connectivity" information such as "the electromagnetic energizer of the fuel injection system is connected to (and controlled by) the engine control unit, which is a computer, and that every engine has an engine control unit and an air pressure sensor".

In an invention architecture embodiment, integrated semantic models as represented by domain maps ("DM"s) may comprise special conceptual models whose class names denote concepts. Concepts provide the "semantic anchor points" from which sources can "hang off" their data. Concepts can be linked via binary relations called roles. Intuitively, a labeled edge $C \rightarrow^r D$ of a DM means that if $c \in C$ then there is some $d \in D$ such that $r(c,d)$ holds: e.g., dendrite$\rightarrow^{has}$ branch means that every dendrite must have some branch.

More particularly, a DM embodiment may comprise a finite set comprising (i) description logic facts, and (ii) logic rules, both involving finite sets C (concepts) and R (roles). Facts are visualized as edge-labeled digraphs where nodes correspond to concepts and edge labels to roles. In this DM embodiment, edges expressing necessary conditions for inclusion of C in D (is a) and existence of r-related objects in D (ex) are most common. If all r-related objects of any $c \in C$ have to be in D, (all) is used. Nodes AND and OR correspond to conjunctions and disjunctions of the union of all outgoing edges, respectively. When unique, AND nodes are omitted and outgoing arcs directly attached to the concept are defied. Necessary and sufficient conditions of C are expressed using (eqv).

Description logic is a subset of first-order logic ("FO"). There are different ways in which we can "execute" the axiom for an edge at the mediator, for example as an integrity constraint or as an assertion: e.g., translating FO(ex) as an integrity constraint in F-logic (FL) tests whether the mediator's object base contains for each X: C a corresponding Y: D; otherwise a violation is reported. Such an integrity constraint is useful when the mediated object base is required to be data-complete wrt. $C \rightarrow^r D$.

The other, more frequent case is to view FO(ex) as an assertion that in the real world (but not necessarily in the object base) the corresponding target object y exists. The following F-logic assertion creates a virtual placeholder object fC;r;D(X) whenever the object base does not contain y:
Y: D, r(X,Y):—X: C, not(Z: D, r(X, Z)), Y=fC;r;D(X).

If necessary, a DM can use the full expressive power of the underlying GCM. However, expressiveness is paid for with complexity and the requirement (EXPR) above can make reasoning about concepts undecidable: Subsumption and satisfiability are undecidable for unrestricted GCM domain maps. Here, subsumption means to decide whether membership in a concept class C implies membership in another class D, for all logic interpretations (i.e., instances of the DM) I that satisfy a given domain map DM. Satisfiability is the question whether such an I exists. Experience suggests that in a typical mediator embodiment of the invention, reasoning about the DM may be required only to a limited extent. Instead, a specific DM is given to navigate the "multiple worlds" and to define and execute integrated views.

With reference drawn to the embodiment architecture of FIG. 3 once again, to process a query input by a user through a user interface 226, a program product embodiment of the invention will use a mediator engine 228 that preferably comprises an F-logic query engine. Examples of available F-logic engines that can evaluate F-logic expressions are FLORA and FLORID. The mediator engine 228 interfaces with the domain map 224 to create the integrated view definition 230 that represents the populated integrated semantic model from the three databases 200-204 responsive to the input query. For example, in the car company X example case, if the machine producing the nozzle of the fuel turned out to be producing larger-than-permitted nozzle diameter, and the parts most serviced turned out to be the fuel-injection unit, then the original query can be answered faithfully by using the domain knowledge illustrated above.

In processing a user query through the architecture of FIG. 3, some query and data conversion and filtering may occur. The query as input from the user, for instance, may be converted to a language consistent with the domain map 224 and the GCM's 218-222 (e.g., F-logic). The query, or portions of the query, may likewise be converted from the GCM language (e.g., F-logic) to the language native to the particular CMW 212-216 (e.g., UML). The query may likewise be partitioned into sub-queries appropriate for each CMW. At the CMW 212-216 level, the thus converted query may then be specified in a query language native to the database. The retrieved results may likewise be ultimately converted to a language consistent with the GCM.

Embodiments of the program product and method of the invention also allow for results obtained from query processing to be viewed in context. That is, results may be presented along with a summary of the logical relations that were pursued to obtain those results. By way of example, assume that a query is answered by applying the query to an integrated semantic model and accessing multiple data sources as guided by the integrated model's relation information. In such a case the mediator may create a graph or other representation that summarizes all the classes and logic relations used during the query processing. This graph will then be made available to the user in addition to data responsive to the query, so that the user can see in what context the data was determined to be responsive. Such a contextual representation of data may be referred to as an "integrated view".

For example, the result graph for the illustrative car-query "which defective parts produced by defective machines have any relationship with the parts that are purchased or serviced most in the parts shops?" would show how the defective part (e.g., the nozzle), the corresponding defective machine, an influence diagram relating the nozzle to the fuel injection unit and the rate of service of the fuel injection unit are correlated.

In order to further illustrate the best mode of practice of the present invention, examples of practice of embodiments of the invention will be presented and discussed herein.

EXAMPLE 1

For purposes of Example 1, assume that three object oriented databases are to be integrated. The first database concerns employees in a municipal streets and sanitation department, and lists department employees by name, job title, and date of hire:

| Streets and Sanitation | | |
| --- | --- | --- |
| Name: | Job Title: | Date of Hire: |
| ... | ... | ... |
| Davis, Jim | Driver | Feb. 13, 1990 |
| Enright, Mike | Helper | Jun. 15, 1997 |
| Franklin, Ed | Driver | Jun. 15, 1997 |
| ... | ... | ... |

A second database concerns the police department for the municipality, and lists officers by name, precinct, and birth date:

| Police Department | | |
| --- | --- | --- |
| Officer: | Precinct: | Birth Date: |
| ... | ... | ... |
| Alex, Jim | 1 | Feb. 13, 1970 |
| Baker, Mike | 1 | Jun. 15, 1967 |
| Conroy, Ed | 2 | Jun. 15, 1957 |
| ... | ... | ... |

The third database concerns the water department, and lists employees by name, job title, and birth date:

| Water Department | | |
| --- | --- | --- |
| Employee: | Job Title: | Birth Date: |
| ... | ... | ... |
| Crabb, Jim | Supervisor | Jan. 3, 1970 |
| Douglas, Ted | Laborer | May 1, 1969 |
| Zlotkowski, Ed | Driver | Jul. 6, 1965 |
| ... | ... | ... |

Assume that these three databases are to be integrated to process the query "How many city workers have a valid driver's license?"

Semantics information obtained from the first database may comprise the knowledge that Streets and Sanitation workers are listed by name, title, and date of hire, with each employee record comprising data members in each of these classes, and with a conceptual model showing the same. Similarly, the conceptual model for the police department database may show that data classes exist for "officers", "precinct", and "date of birth". Finally, the water department database conceptual model may show that it contains data classes for "employee", "job title", and "birth date".

To create an integrated semantic model of these three databases sufficient to process the query: "how many city employees have a valid driver's license?", secondary knowledge is required to logically connect the classes of the three databases, as well as to provide other data not available from the databases. By way of example, assume expert knowledge is available to show that 1) all police officers have a driver's license, 2) all drivers in the streets and sanitation department have a valid driver's license, 3) all drivers in the water department have a valid driver's license, and 4) all members of the police department, water department, and streets and sanitation department are city employees.

With this secondary knowledge, an integrated view of the three databases can be created for processing the query. The view can illustrate the logic inferences made to process the query, so that the user may view resultant data in the context from which it comes. Now, the original query, "How many city workers have a valid driver's license?" will be transformed into the following query plan:

At the mediator: Unfold the view "city worker" as the union of the three data sources.

From "Streets and Sanitation": count all employees whose job title="Driver"; assign to variable A at mediator.

From "Police Department": count all employees; assign to variable B at mediator.

From "Water Department": count all employees whose job title="Driver"; assign to variable C at mediator.

At the mediator: compute result=A+B+C

EXAMPLE 2

Two Neuroscience Worlds

A second example invention embodiment comes from the biological arts, and shows an invention embodiment in a somewhat complex real world application.

Consider two Neuroscience laboratories that perform experiments on two different brain regions. The first laboratory, SYNAPSE, studies dendritic spines of pyramidal cells in the hippocampus. The primary schema elements are thus the anatomical entities that are reconstructed from 3-dimensional serial-sections. For each entity (e.g., spines, dendrites), researchers make a number of measurements, and study how these measurements change across age and species under several experimental conditions.

In contrast, the NCMIR laboratory studies the Purkinje Cells of the cerebellum, inspecting the branching patterns from the dendrites of filled neurons, and localization of various proteins in neuron compartments. The semantic information from the data source indicates that schema used consists of a number of measurements of the dendrite branches (e.g., segment diameter) and the amount of different proteins found in each of these subdivisions. Assume that semantic information from each of the databases indicates that each of the two schemas has a class C having a location attribute that can have a value like "Pyramidal Cell dendrite" and "Purkinje Cell", respectively.

How are the schemas of SYNAPSE and NCMIR, as represented in their generic conceptual models, related? Evidently they carry distinctly different information and do not even enter the purview of the schema conflicts usually addressed in database integrations of the prior art. To an expert scientist however, they are related through the following reason: Release of calcium from spiny dendrites occurs as a result of neurotransmission and results in changes in spine morphology (sizes and shapes obtained from SYNAPSE). Propagation of calcium signals throughout a neuron depends upon the morphology of the dendrites, the distribution of calcium stores in a neuron and the distribution of calcium binding proteins, whose subcellular distribution for Purkinje cells are measured by NCMIR.

Thus, a researcher who wanted to model the effects of neurotransmission in hippocampal spines could get structural information on hippocampal spines from SYNAPSE and information about the types of calcium binding proteins found in spines from NCMIR. Note that in order to connect the two sources, we need, independent of the observed experimental source data available from the data sources, secondary knowledge like the following:

Purkinje cells and Pyramidal cells have dendrites that have higher-order branches that contain spines.

Dendritic spines are ion (calcium) regulating components. Spines have ion binding proteins.

Neurotransmission involves ionic activity (release). Ion-binding proteins control ion activity (propagation) in a cell. Ion-regulating components of cells affect ionic activity (release).

This secondary knowledge may be provided, for instance, by an expert scientist, a data file, or the like. To formalize this secondary knowledge we can use description logic (DL) statements such as:

Neuron ⊑ ∃has.Compartment

Axon, Dendrite, Soma ⊑ Compartment

Spiny Neuron ≡ Neuron ⊓ ∃has.Spine

Purkinje Cell, Pyramidal Cell ⊑ Spiny Neuron

Dendrite ⊑ ∃has.Branch

Shaft ⊑ Branch ⊓ ∃has.Spine

Spine ⊑ ∃contains.Ion_Binding_Protein

Spine ⊑ Ion_Regulating_Component

Ion Activity ⊑ ∃subprocess_of.Neurotransmission

Ion_Binding_Protein ⊑ Protein ⊓ ∃controls.Ion_Activity

Ion_Regulating_Component ≡ ∃regulates.Ion_Activity

Figure 4:
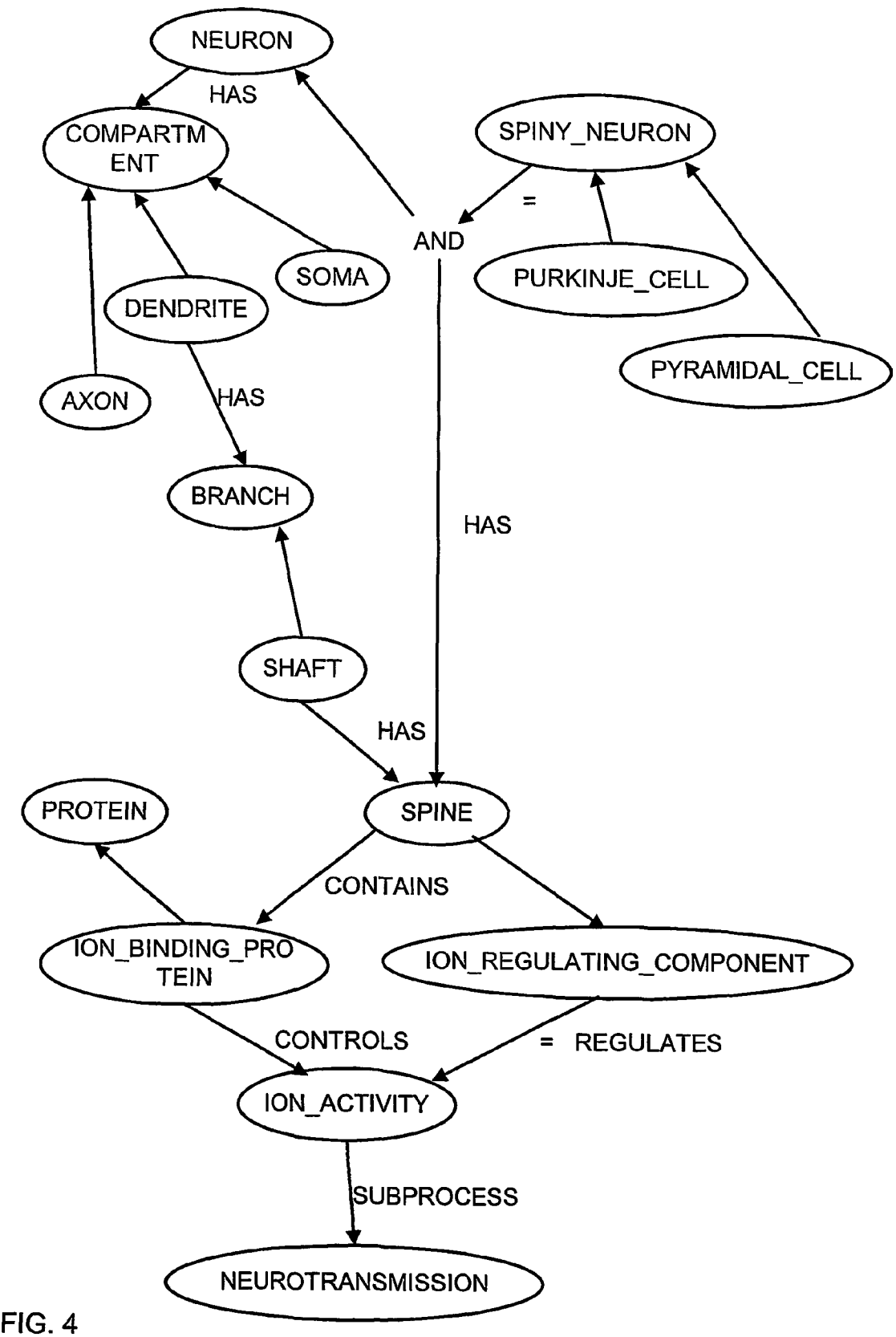
FIG. 4 is a graphic representation of secondary knowledge in the form of a domain map useful in an example application of an invention embodiment.

Together with additional inference rules (e.g., for transitivity of has), DL axioms like these formally capture the secondary knowledge. FIG. 4 shows a graphic portrayal of these DL formulas in the form of a domain map, a kind of semantic net that may be used for defining and executing integrated queries at the mediator.

This example from a real-world biological science integration scenario illustrates a novel aspect of the present invention over the prior art. In particular, in the present invention seemingly unconnected schema can be semantically related through secondary knowledge, which in effect situates the data in the scientific context.

EXAMPLE 3

Adding a New Data Source

Example 3 is presented to further illustrate the extendability of invention embodiments. As discussed above, a novel advantage of the present invention is that new data sources may be readily added to existing federations of integrated data sources. New sources may be added through registration of their conceptual models with the mediator. If the mediator does not "recognize" the semantic representation of the new data source, a plug-in converter may be provided for converting to the recognized GCM uniform language.

Thus new data sources may bring their own semantic information incuding, but not limited to, constraints. After registration of the new data source, the mediator refines the integrated semantic model domain map DM to reflect the new data classes and semantic information.

Figure 5:
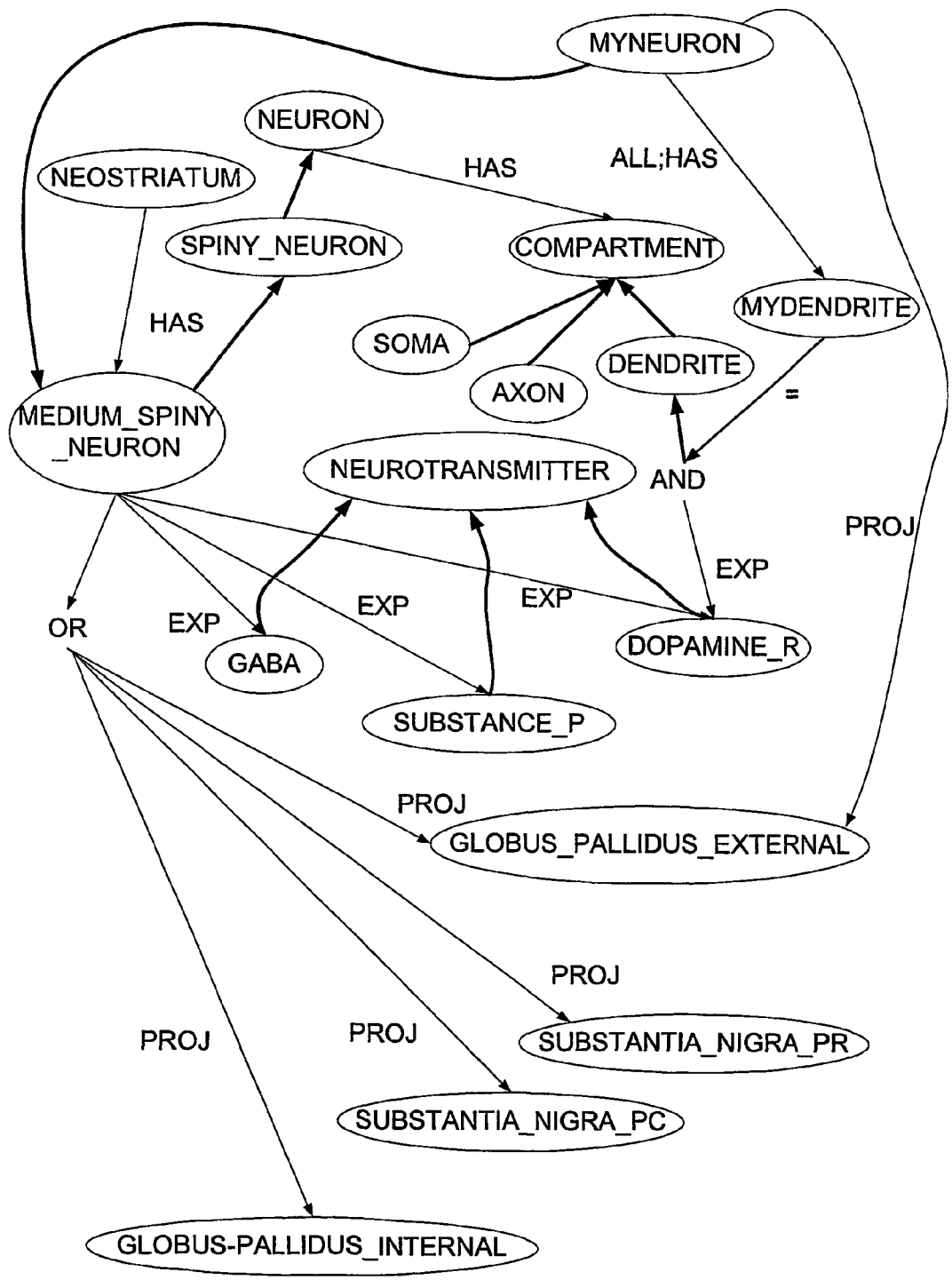
FIG. 5 is a schematic illustrating an example invention embodiment refined secondary knowledge domain map.

By way of example, FIG. 5 illustrates a refined DM. FIG. 5 depicts a DM after registering two new concepts MyNeuron and MyDendrite. The knowledge about these is sent to the mediator using data logic axioms:

MyDendrite ≡ Dendrite ⊓ ∃exp.Dopamine_R

MyNeuron ⊑ Medium_Spiny_Neuron

⊓ ∃proj.Globus pallidus external

⊓ ∀has.MyDendrite

Thus instances of MyDendrite are exactly those dendrites that express Dopamine R(eceptor), and MyNeuron objects are medium spiny neurons projecting to Globus Palladius External and only have MyDendrites. Assuming properties are inherited along the transitive closure of isa, it follows that MyNeuron, like any Medium Spiny Neuron projects to certain structures (OR in FIG. 5). With the newly registered knowledge, it follows that MyNeuron definitely projects to Globus Palladius External. If we want to specify that it only projects to the latter, a nonmonotonic inheritance, e.g., using FL with well-founded semantics can be employed.

EXAMPLE 4

Checking Inductive Properties

Example 4 is provided to better illustrate an invention embodiment aspect related to checking the consistency and integrity of logic declarations used in GCM's and/or secondary knowledge sources of the invention. This example uses logic language of F-logic ("FL").

The following integrity constraints test whether a binary relation R is a partial order on a class C: rule (1) finds all X in C for which R is not reflexive. Similarly, (2) reports missing transitive edges, and (3) derives node object pairs that violate R's anti-symmetry on C. Thus, R is a partial order on C iff (1-3) do not insert a failure witness into integrity class ic:

(1) $w_{rc}(C,R,X)$: ic:-X: C, not R(X,X).

(2) $w_{tc}(C,R,X,Z,Y)$: ic:-X,Y,Z: C, R(X,Z), R(Z,Y), not R(X,Y).

(3) $w_{as}(C,R,X,Y)$: ic:-X: C, R(X,Y), R(Y,X), X Y.

If we assign "::" and the meta-class "class" (holding all class names) to the relation variable R and class variable C respectively, the above rules test whether "::" is indeed a partial order. This example also illustrates the power of schema reasoning in FL.

EXAMPLE 5

Cardinality Constraints

Example 5 is presented to better illustrate logic cardinality constraint aspects of embodiments of the invention. Example 5 uses FL language logic statements, and is set in the data context of the biological arts.

Aggregation and cardinality constraints are ubiquitous in real applications. Consider the GCM declaration relation(R, $A/C_1, B/C_2$) and assume the CM at hand specifies that the cardinalities of roles A and B satisfy the conditions $card_A(N) := (N=1)$ and $card_B(N) := (N \leq 2)$. Applied to has(neuron, axon) this says that a neuron can have $\leq 2$ axons and an axon is contained in exactly one neuron; more formally:

$w_1(R,VB,N)$: ic:-N=count{VA[VB];R(VA,VB)}, N 1.
$w_{>2}(R,VA,N)$: ic:-N=count {VB[VA];: R[A VA;B VB]}, N>2.

The body of the first rule counts for each value VB of B the number N of values VA. If N 1 a cardinality violation is detected and the witness $w_1$ gives the violating triple R, VB, N. The second rule illustrates a different FL syntax for tuple objects and checks $N \leq 2$ for B by grouping on VA.

EXAMPLE 6

Consider a neuroscience laboratory called NCMIR that studies nerve cells of the brain region called cerebellum, inspecting structures within several types of cells, and localization of various proteins in neuron compartments. We can illustrate the schema for this data using tables like:

- object declaration for brain section from which the cells were studied section (ID, preparedFrom, anatomicLocation, microtome, thickness, fixationMethod);
- object declaration for protein localization proteinLocalization (ID, proteinName, probeType, probeName, protocolID, probeRefID, section);
- object declaration for protein labeling regionOfInterest (regionID, imageID, proteinLocalizationID, points, objectName, area, averageIntensity, varianceIntensity);

When a step of an invention embodiment exports this information as a conceptual schema to the mediator, the conceptual wrapper may define a new exported class called proteinAmount instead of the class regionOfInterest declared in F-logic syntax as:

proteinAmount[proteinName=>string, imageID=>string, regionID=>string; objectName=>string; amount=>integer], which is defined as:

proteinAmount[proteinName→P; imageID→I; regionID→R; objectName→O; amount→A]:— regionOfInterest.regionID=Y, regionOfInterest.imageID=I, regionOfInterest.proteinLocalizationID=protein Localization.ID, regionOfInterest.objectName=O, regionOfInterest.amount=getAmount(regionOfInterest.averageIntensity, regionOfInterest.varianceIntensity, regionOfInterest.area, M), M=A.

where getAmount is a function that assigns the values in a scale of 0 to 5 based upon some intensity-based computation.

Next, consider a second laboratory called, SENSELAB, that determines how one neuron transmits information to another. Let us consider two of their conceptual classes:

neuron[name=>string; location=>string; organism=>string; type=string].

and neurotransmission[organism=>string; transmitting neuron=>string; transmitting compartment=>string; receiving neuron=>string; receiving compartment=>string; neurotransmitter=>string].

Now at the mediator, an integrated semantic model may define a "mediated class" called protein_distribution as follows:

D: protein distribution[protein_name→Y; animal→Z; distribution_root→P; distribution→D]:—'NCMIR'.protein.name=Y, 'SENSELAB'.neuron.organism=Z, contains('ANATOM'. nervous_system.has a star, P), aggregate(Y, 'NCMIR'.protein_amount. amount, has a star, P, D).

To define this mediated class, a secondary knowledge source called 'ANATOM' has been used which is a taxonomy of the animal kingdom. The distribution_root P is the name of a brain region like cerebellum such that the aggregate of the protein Y is computed on starting from this region P. The predicate has_a_star computes the deductive closure over the has_a and isa relations in 'ANATOM', and is defined with respect to any relation R as follows:

tc(R)(X,Y):-R(X,Y).
tc(R)(X,Y):-tc(R)(X,Z), tc(R)(Z,Y).
dc(R)(X,Y):-tc(isa)(X,Z), R(Z,Y).
dc(R)(X,Y):-R(X,Z), tc(isa)(Z,Y).
has a star(X,Y):-dc(has a)(X,Y).

The function "aggregate" recursively traverses a binary relation R (here: has a star) starting from node P, and computes the aggregate of the specified attribute at each level of the relation R.

Now using these "integrated views" (in the form of mediated classes form the integrated semantic model) and the exported classes from the sources, we can answer the following query:

"What is the distribution of those calcium-binding proteins that are found in neurons that receive signals from parallel fibers in rat brains?"

In terms of the given views, this user query can be written as:
answer(P, D):—neurotransmission[organism→'rat'; transmitting compartment→'parallel fiber'; receiving neuron→X; receiving compartment→Y], D: protein distribution[protein name→P; ion_bound→→{calcium}; distribution root→_].

This is a typical query of a scientist who studies neurotransmission (and produces the data of SENSELAB above), and needs information gathered by groups that study protein localization (like NCMIR). Note that the user does not specify the distribution root, forcing the mediator to provide a "reasonable" root for the neuron-compartment pairs that satisfy the first condition. The following are the main steps of the query plan executed at the mediator:

1. push selections (rat, parallel fiber) to SENSELAB and get bindings for X and Y
2. using the domain map DM(M), select sources that have data anchored for the neuron/compartment pairs X, Y from step (1); in our case, only NCMIR is returned
3. push selections given by the X, Y locations to NCMIR, and retrieve only proteins P that are found in X, Y Now the mediator needs to compute the actual distribution of each protein P from NCMIR. But to do this using the view defined earlier, we first must determine which brain region of the neuron should serve as the root of the distribution. This is accomplished by computing the least upper bound (lub) of locations in the domain map.

4. with the lub as the root node, compute the view protein distribution at the mediator as described before. Note that this involves a downward closure along the has a star relation. The last two operations filter out a segment in the domain map as the "region of correspondence" between the two information sources, and demonstrate how graph operations on the domain map can be actively used to compute conceptual mappings between sources.

This example demonstrates the actual complexity of the steps involved in correlating conceptually related but schematically distant information sources using the framework of the invention.

Figures 6, 8:
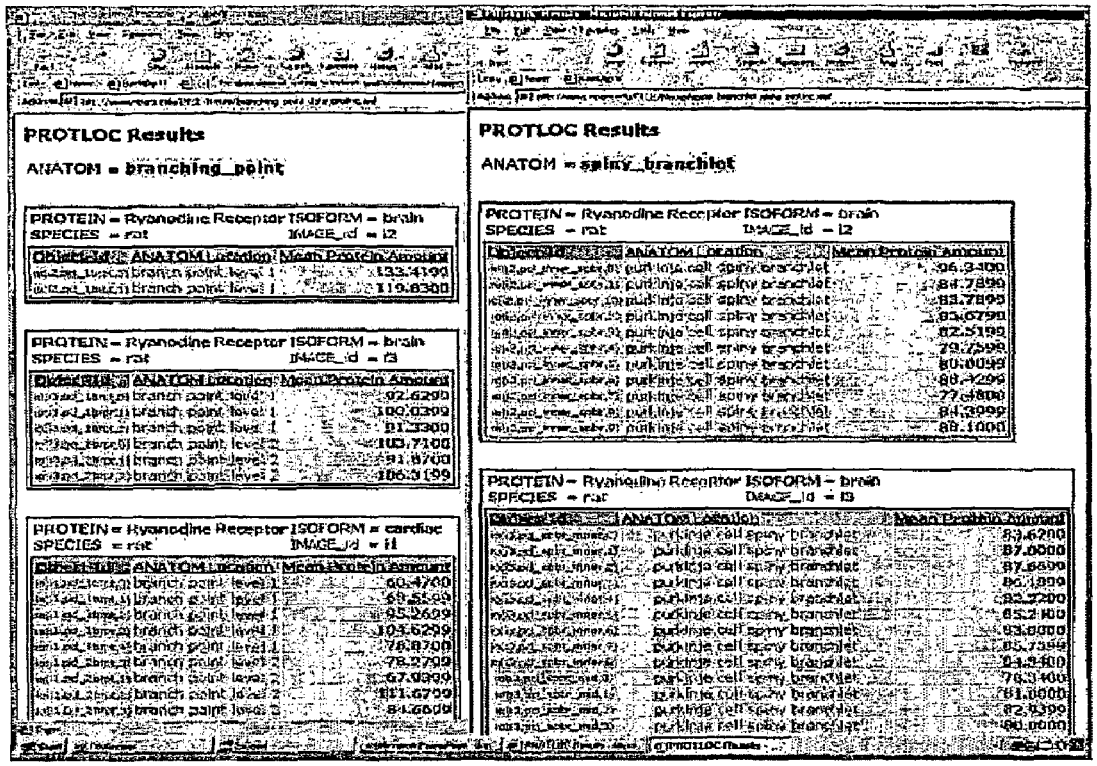
FIG. 6 is an example input screen from a computer program invention embodiment.
FIG. 8 is an example numerical data output screen from a computer program product embodiment.
Figure 7:
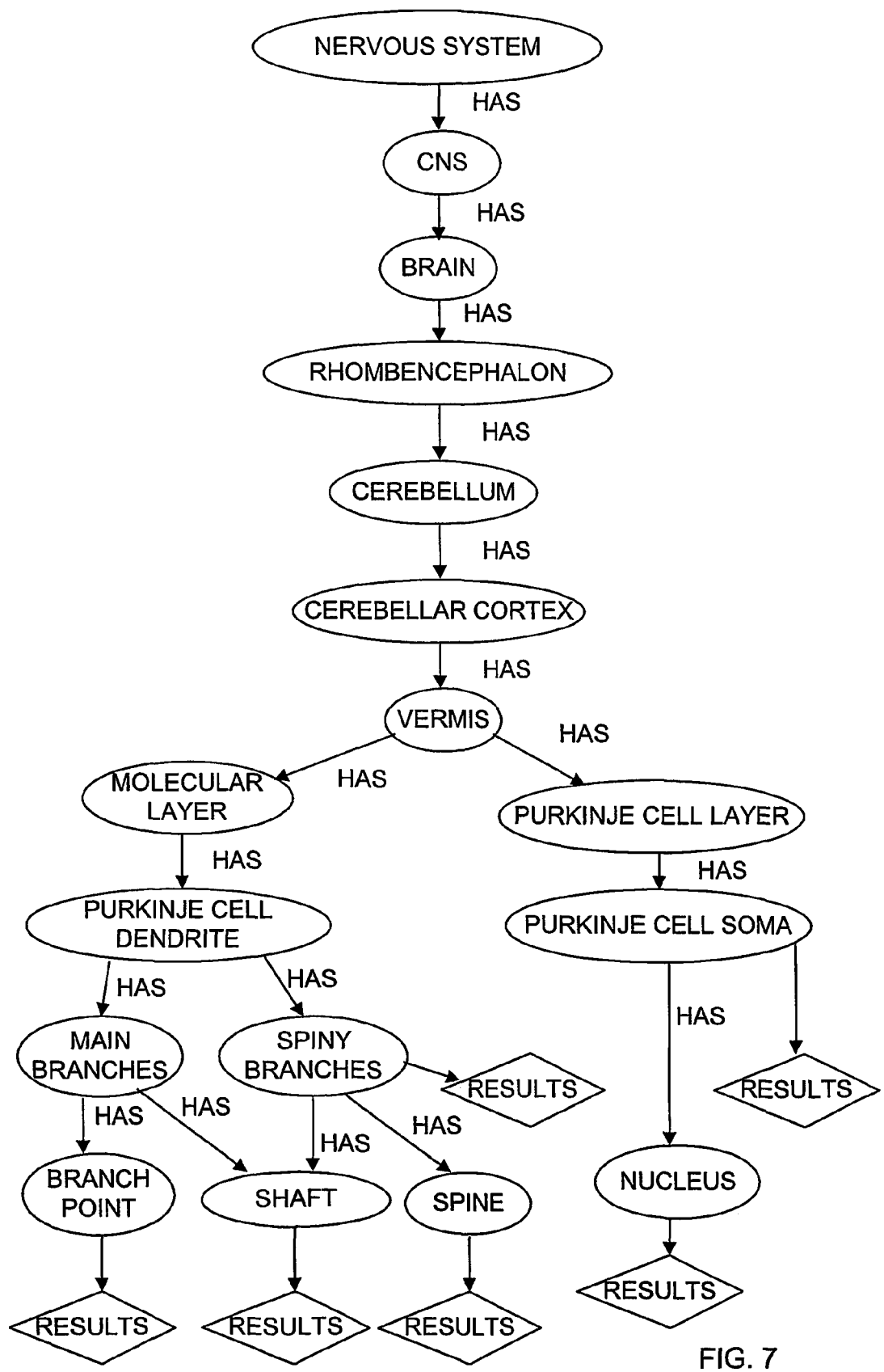
FIG. 7 is an example schematic illustrating an invention embodiment aspect related to presenting output data in context.

FIGS. 6-8 illustrate graphical interfaces presented through a program embodiment in processing this example query. FIG. 6 illustrates a screen for inputting a query. FIG. 7 illustrates a contextual presentation of results, with classes (ovals) that were related in processing the query connected by relational lines, and results illustrated by the diamond shapes. The embedding of the diamond shape result -nodes to data classes illustrates a novel aspect of the invention related to presenting results in a contextual basis. In an invention embodiment, selecting any of these diamonds by, for instance, use of a mouse, can result in display of the numerical data representing the integrated view, with an example display screen shown in FIG. 8 after selection of two diamonds from FIG. 7.

EXAMPLE 7

Extensive Mediator Architecture Discussion and Examples

Example 7 offers an extensive discussion of the overall scope of an invention embodiment, and it presented with substantial detail in order to thoroughly illustrate practice of the invention. Example 7 itself contains several sections and invention embodiment examples that generally are taken form the art of biological science.

A grand goal in many disciplines of biological research is to understand the workings of a biological organ like the brain and how the interplay of different structural, chemical and electrical signals in the biological tissues gives rise to natural and disease processes. To achieve such a goal, however, it is essential to develop an integrated understanding of very different, but conceptually correlated studies and data produced from diverse biological subdisciplines. Most importantly:

Biologists assess different animal models to study different aspects of the same biological function. Thus, for a given research problem, they may wish to integrate information about the cytoarchitecture of sensory cortex from the somatosensory cortex of the rat, the brain areas involved in vision from the primate, the physiology of receptive fields from the cat, the distri-bution of key proteins involved from the rat, and the molecular underpinnings of synaptic plasticity from the mouse.

Biologists study the same biological system from multiple perspectives. For example, in the study of calcium regulation, researcher A may take a physiological approach, using patch electrodes to study calcium currents; researcher B may take an anatomical approach, mapping the distribution of different isoforms of calcium regulatory proteins and the organelles that ex-press them; a biochemist C may study signal transduction cascades and levels of protein activity using Western blots and assay systems, a pharmacologist D may use a panel of channel blockers, agonists or antagonists to study the response in single cells or the whole animal to alterations in calcium regulation.

The goal of this Example 7 is to present invention method and program embodiments that integrate different studies and analyses conducted by biologists performing different experiments, such that the integrated body of information can be queried and navigated across. Once such information is integrated, the practicing biologist can use the system to discover biologically significant correlations and use the discovery to plan future work in the context of available data.

As is true in many other arts, the integration challenge is that source data cannot be joined using simple term-matching or comparison operators. Even more sophisticated approaches which use ontologies to enumerate joinable terms are often not sufficient. Instead a join should be performed based on whether the objects satisfy some application-specific condition. For complex integration scenarios like a neuroscience application, a more expressive formalism is necessary to specify these "semantic join conditions". In particular, the formalism should have inferencing mechanisms to reason over domain knowledge if necessary.

In summary, Example 7 develops an invention embodiment program and method, referred to within Example 7 as "KIND" (Knowledge-based Integration of Neuroscience Data), that represents a substantial improvement over conventional wrapper-mediator methods and programs of the prior art with one or more secondary knowledge sources referred to as domain knowledge bases that provide the "semantic glue" between sources through facts and rules from the application domain. Thus our mediator enhances view-based information integration with deductive capabilities. Data manipulation and restructuring operations for integration can be performed not only on the base data from the sources but also on intensional data derivable from the knowledge bases. To this end, we employ the deductive object-oriented language F-logic and demonstrate that it can handle the given complex integration problems.

It should be emphasized that the integration problem addressed by the present invention and the embodiments of Example 7 is different from the problems addressed in prior art efforts that relate to issues like schema integration, resolving conflicts and mismatches (structural, extensional, naming, etc.), global query processing in the presence of local autonomy etc. Those heterogeneities are between different representations of essentially the same (or very similar) real world entities. In contrast, the present invention deals with sources containing inherently different (but related through "expert knowledge") information.

The remainder of Example 7 is organized as follows. Example 7.2 provides a brief introduction to F-logic to clarify the notation and concepts used subsequently. Example 7.3 presents a motivating example that illustrates the nature of the information integration task for the given problem domain. Example 7.4 presents an invention embodiment architecture and explains the role of F-logic in the representation of schema, knowledge and in the inference mechanism. Example 7.5 illustrates a particular instance of the invention embodiment as applied to the Nueroscience art in the form of "INSM" (Integrated NeuroScience Model). Finally, Example 7.6 shows in more detail how integrated views are defined and queried in INSM using semantic information.

EXAMPLE 7.2

F-Logic Summary

Because the invention embodiment of Example 7 is based on F-logic, we briefly introduce the syntax and basic concepts of F-logic. For additional teaching regarding F-logic, reference is made to "Logical Foundations of Object Oriented and Frame Based Languages, M. Kifer, G. Lausen, and J. Wu; Journal of the ACM, 42(4):741-843, July 1995; incorporated herein by reference. While there are other formalisms that could possibly be used, F-logic is preferred for several reasons: F-logic is a declarative language with rich modeling capabilities (class hierarchy, complex objects, inheritance, etc.) and a powerful rule language. It has its roots in AI (frame-based knowledge representation) and deductive object-oriented databases. Apart from "pure" database modeling and querying, it has been applied in several related (but different) areas, including schema transformation, information integration, querying the Web, knowledge representation/reasoning with ontologies, and management of semistructured data.

F-logic extends Datalog and first-order logic (including Skolem functions). In particular, well-known transformations can be used to map arbitrary first-order constraints to equivalent stratified Datalog (and thus F-logic) rules. Finally, F-logic query evaluation engines such as FLORA [FLOa], FLORID [FLOb], and SILRI are readily available (and continue to be improved).

F-logic Syntax and Object Model

Symbols: The F-logic alphabet comprises sets F, P, and V of object constructors (i.e., function symbols), predicate symbols, and variables, respectively. Variables are denoted by capitalized symbols (X, Name, ...), whereas constants and function symbols (0-ary and n-ary object constructors) are denoted in lowercase (cerebellum, foo (bar,baz), ...) unless quoted ('Cerebellum'). An expression is ground if it involves no variables. In addition to the usual first-order symbols, there are special symbols such as: ], [, {, }, →, →→, ⇒⇒:, ::.

Id-Terms/Object-Ids (Oids):
 (0) First-order terms over F and V are called id-terms, and are used to name objects, methods, and classes. Ground id-terms correspond to logical object identifiers (oids). In particular, constants and strings ("cerebellum") are oids; the latter are conceived as character lists, i.e., nested ground terms.

Atoms: LetO; M; Ri; Xi; C; D; T be id-terms. In addition to the usual first-order atoms like p(X1; ::::; Xn), there are the following basic types of atoms:
 (1) O[M→$R_0$] (single-valued meth. app.)
 (2) O[M$R_1$; . . . , $R_{ng}$] (multi-valued meth. app.)
 (3) C[M⇒T] (single-valued class signature)
 (4) C[M⇒T]. (multi-valued class signature)
 (1) and (2) are data atoms and specify (at the instance level) that the application of method M to the object with oid O yields the result object with oid Ri.In(1), M is single-valued (or scalar), i.e., there is at most one R0 such that O[M→$R_0$] holds. In contrast, in (2), M is multi-valued, so there may be several result objects $R_i$. For n=1 the braces may be omitted. (3) and (4) denote signature atoms and declare that the (single/multi-valued) method M applied to objects of class C yields instances of type (i.e., class) T. The organization of objects into classes is specified by isa-atoms:
 (5) O: C (O is an instance of class C)
 (6) C:: D. (C is a subclass of D)

Path Expressions: F-logic supports path expressions to simplify object navigation along single-valued and multi-valued method applications and to avoid explicit join conditions. The following path expressions are allowed in place of id-terms:
 (7) O.M (single-valued path expression)
 (8) O..M (multi-valued path expression)
The path expression (7) is single-valued and refers to the unique object $R_0$ for which O[M→$R_0$] holds, whereas (8) is multi-valued and refers to each $R_i$ for which O[M→→{$R_i$}] holds. O and M may be id-terms or path expressions. Although not part of the core syntax, generalized path expressions 4 can be defined by means of rules.

Parameters: Methods may be parameterized, so M@($X_1$; : : :; $X_k$) is allowed in (1-4) and (7-8).
 Example: $o_{rat}$ [name@(scientific)→"Rattus rattus"].

Rules: A rule is of the form: Head IF Body
 where Head and Body are conjunctions of F-logic atoms (read "if a ground instance satisfies Body then also the Head"); a program is a set of rules.

F-molecules are a concise notation for several atoms specifying properties of the same object: for example, instead of $o_{rat}$: taxon ˆ $o_{rat}$ [name@(common)→"rat"]ˆ $o_{rat}$ [order→"Rodentia"] we can simply write
 $o_{rat}$: taxon[name@(common)→"rat"; order→"Rodentia"]
In F-logic rules "," is shorthand for "ˆ".

Object Model

An F-logic database (instance) is a set of ground F-logic atoms. The basic relations among objects (→, →→, ⇒,⇒) in this model can be represented as a labeled graph where nodes are oids and where edges are labeled with the corresponding arrow and the method name. From base facts additional facts can be derived by means of rules.

EXAMPLE 7.2.1

Fragment of ANATOM

The following is a fragment of ground F-logic atoms and molecules that make up the anatomical knowledge base ANATOM:
 nervous_system[has@(struct)→→{cns,pns}].
 cns[has@(struct)→→{brain, spinal cord}].
 brain[has@(struct)→→{telencephalon, diencephalon, mesencephalon,rhombencephalong}].
 . . .
 cerebellar_cortex[has@(func)→→{hemisphere, vermis, flocculus, parafloccular lobes}]
 eukaryotic cell:: cell.
 brain_cell:: eukaryotic_cell.
 neuron:: brain_cell.
 glia:: brain_cell.projection_neuron:: neuron.
 interneuron:: neuron.
 purkinje_cell:: projection_neuron.
 . . .
 schwan_cell:: glia.

The first two groups of facts describe has-a relationships which are either structural or functional, the third group specifies the is-a hierarchy of brain cells using F-logic's subclass connective":"

Based on such a fact base, rules are used to specify intensional knowledge (which is derivable on-demand at runtime). For example, the transitive closure of all has-a relationships (structural, functional, . . . ) can be expressed by a single recursive rule:
 X[has@(P)→→{Y}]IF X..has@(P)..has@(P)=Y.
thereby illustrating the expressive power of rules using parameterized methods, path expressions, and recursion.

EXAMPLE 7.3

Integration Across Multiple Worlds: Motivating Examples

Consider three research groups: Group A studies neuroanatomy of rodents, group B studies calcium regulatory proteins in vertebrates and group C studies neurotransmission phenomena in mammals.

Group A ("Neuroanatomy"). Let us assume that group A has a database of studies, where a study consists of a number of experiments on a specific research problem. Each experiment records a number of experimental parameters in the form of (name,value) pairs, and produces a number of images. We focus on a specific image class called protein labeling images. For each protein label image the anatomical parameters (i.e., which anatomical region the image represents) and the protein used are recorded. Each image is segmented into a number of segments, based upon the amount of protein staining. The image is also represented as a collection of named anatomical structures visible in the image.

Each anatomical structure is modeled as a collection of segments, such that aggregate features like the distribution of stain within an anatomical structure may be computed. Very often a single biological study involves a number of experiments conducted at different granularity levels in the animal.

For example, experimenters may try to localize a protein in a tissue, a cell, specific cellular compartments and in intracellular substructures. In this case, the anatomical parameters of an image at any level are semantically related to those of an image at the next coarser level although this relation may not be directly visible from the schemas. We will explain how this is modeled in Section 6. In some experiments, specific anatomical structures from a stack of confocal images or a series of electron micrographs are re-constructed into volumetric objects modeled as geometric entities, and specific 3D properties such as the surface to volume ratio are measured. The volumetric information is stored in a separate database DENDREC. The 3D anatomical models are related to the images from which the reconstruction was made. In our example, DENDREC contains the reconstruction of spiny dendrites in the rat neostriatum.

Group B ("Calcium-Binding Proteins"). Next, let us assume group B to have a database of calcium-binding proteins 5 where each protein is identified by its reference number in the PDB 6 and/or the reference number in the SWISS-PROT 7 database. Otherwise it is identified by an internal identifier. A protein has a molecular weight, an amino acid sequence, the number of amino acids and is grouped with a number of other proteins that belong to the same family. Its isoforms, mutants and the species in which the mutants are found are also recorded. Every protein subfamily and mutant form is also given a unique identifier. For every protein the researchers also record the interaction of the protein with elements and ions, the evidence of signal transduction pathways it participates in and the disease processes it contributes to. The database organizes the signal transduction and disease information by the species where the evidence has been found. Also grouped by species, the researchers record the tissue and cell-level localization they have found in their experiments. However this group does not conduct any experiments at a subcellular level. Although the system does not store the genetic code of the proteins they study, they maintain the reference identifier for the protein form in the GENBANK 8.

Group C ("Neurotransmission"). Finally, group C stores information about neurotransmission including neurotransmitter substances, neurotransmitter receptors and voltage-gated conductances in a database NTRANS 9. In this system every neuron is modeled to be composed of a canonical set of non-overlapping compartments. For every compartment of each neuron studied, the experimenters record the input receptors and their description, the intrinsic ionic currents along with their description, and the output transmitters. The description contains a textual account of the function of the receptor or transmitter, the brain region where they are active. Each type of current is characterized by the ions that generate them, their electrical properties, and their firing characteristics. Receptors and transmitters are also organized into families, representable by a tree structure.

When these systems are integrated, a biologist would like to make queries such as:

Find the cerebellar distribution of rat proteins with more than 90% amino acid homology with the human NCS-1 protein. Compare the distribution of this protein or its homologs in other rodents.

Are any calcium-binding proteins found only in the thin dendritic spines of the rat neostriatum and not in the stubby spines? Do these proteins always co-localize?

Is there any experiment performed on other mammals on the proteins involved in signal transduction in the visual systems of primates? How similar are these proteins?

A major challenge in today's bioinformatics is to find ways to correlate, combine and unify information from multiple data sources such as described above. But even with many online data sources and information retrieval tools, biologists have little or incomplete technological framework to make this unification possible across disciplines, scales of observation and diversity of viewpoints. As a result, they perform the "integration" task manually, by physically assembling data from multiple sources and putting them together by individual effort. Hence they are seldom allowed the luxury to make "inter-database" queries although the capability to perform such queries is fundamental to the task of the broad-based knowledge unification that they seek. An ostensible source of difficulty arises from the semantic incompatibilities both within and between the data sources.

For example, consider that group A has a number of experiments on the protein distribution of basket cells and their neighboring Purkinje cells without stating that they both belong to the rat cerebellum. We need to model and use this additional piece of knowledge in order to answer the first query. Similarly, the fact that proteins are related because they share amino acid homologies is never recorded because it is "common knowledge" to the domain. However, unless this information is explicitly available from a supplementary source, the query cannot be answered.

In addition to the need for having additional knowledge integration of biological information also have the following issues:

The information representation at the mediator should be flexible enough to accommodate a wide degree of heterogeneity at the data sources, and at the same time, represent the class-structure evident from the taxonomic character of the data. To accommodate this, we use an object-oriented formalism, but unlike the collection-based model used in the prior art, we use F-logic that is well-equipped to represent object-orientation, flexible enough to represent semistructured data, and has the machinery to perform inferences and recursive computation such as path expressions and transitive closure.

The computation of numeric aggregates and numeric features describing the content of 2D and 3D images and reconstructed volumes is an essential component of the data to be integrated. Equally important is the need to represent complex semantic rules to model the associations between numeric features computed from multiple image and volume instances.

Queries involving graph operations such as graph intersection and computation of the spanning tree are important in discovering the associations between data coming from different sources that are initially unconnected. Meta-level reasoning with schema and attributes are an important component in creating these associations.

EXAMPLE 7.4

The Integration Framework

Most current approaches to integration of information from heterogeneous sources are based on the prior art mediator architecture as discussed herein above in the Background of the Invention section. The problem of heterogeneous data models of sources is solved by translating the data into a common language using wrappers. The semistructured data model (essentially labeled directed graphs) in general and XML in particular have been shown to be suitable target data models. Once the data can be accessed in a uniform way, a mediator is used to integrate between the different local views and schema elements, based on the specification of an integrated view.

The definition of such an integrated view can often be a highly complex task and requires dealing with all of the well-known integration problems from information integration in databases like structural, semantic, and descriptive conflicts (e.g., flat vs. nested relational vs. object-oriented modeling, homonyms, synonyms). Thus, for complex integration tasks, a powerful declarative specification language is required, e.g., for querying and restructuring local schemas, mapping data between models and schemas, integrity checking, and knowledge inference.

EXAMPLE 7.4.1

The KIND Architecture

Figure 9:
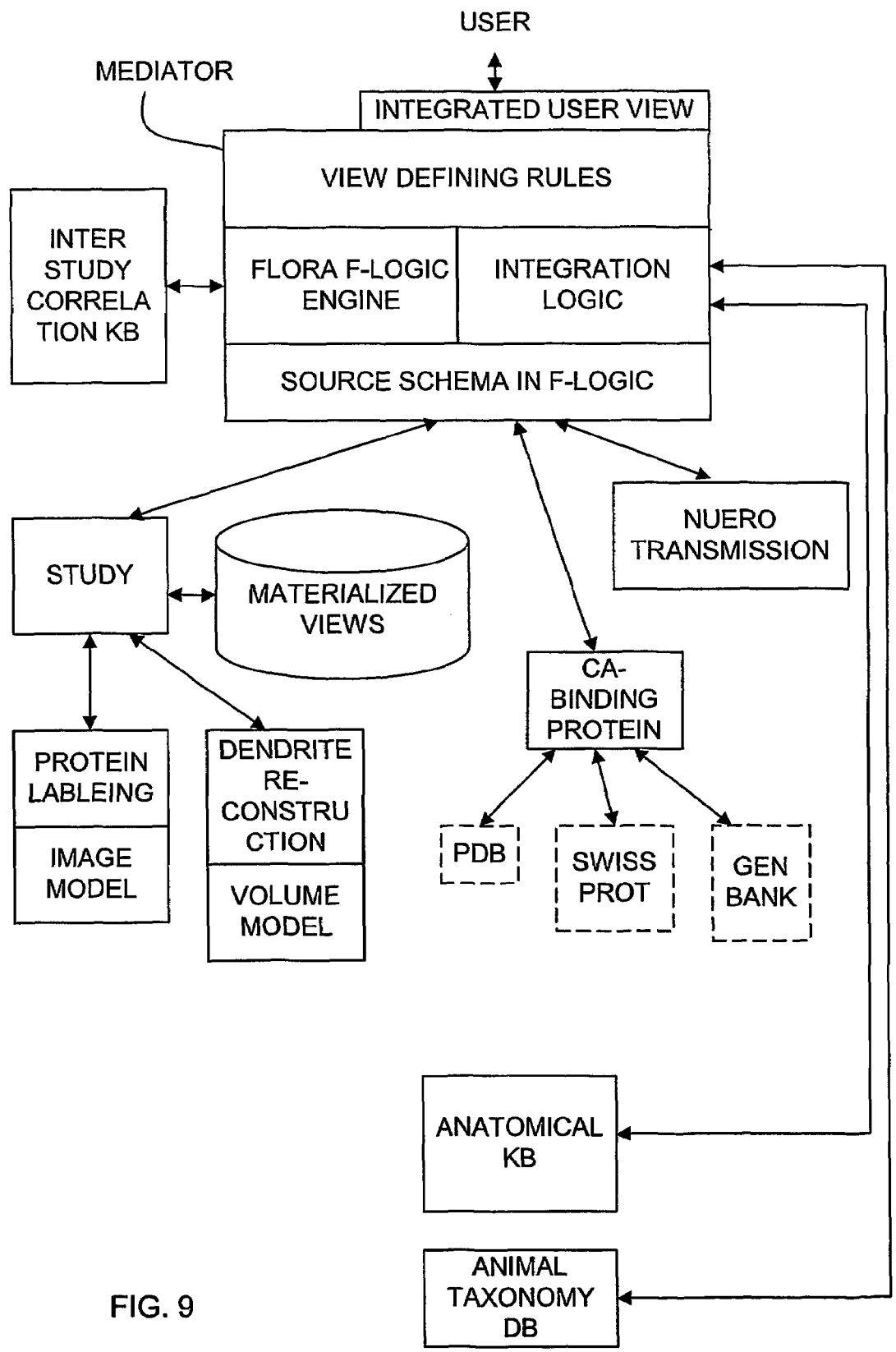
FIG. 9 is a schematic illustrating an example invention embodiment architecture

For our neuroscience application domain, an invention embodiment called KIND, with the schematic of FIG. 9 illustrating an architecture of the embodiment. The main data sources are scientific STUDIES of various types which themselves can refer to further heterogeneous data sources like PROLAB (image databases of protein labelings) and DENDREC (volumetric reconstructions of dendrites). Other KIND sources are CAPROT (calcium-binding protein databases) and NTRANS (neuro-transmission database). Apart from these sources of observational data, there are also sources with general domain data and knowledge like ANATOM (anatomical knowledge base) and TAXON (animal taxonomy database).

Unlike prior art mediator approaches that solely use the semistructured model throughout the integration, the present embodiment additionally incorporates a rich object-oriented knowledge representation formalism, i.e., F-logic into the architecture.

This enables a better modularization and more adequate modeling of complex application domains like biology and neuroscience. In our biological integration domain, for example, links between otherwise unrelated data are established using expert knowledge (like anatomical, taxonomic, or partonomic relationships) that is represented using F-logic rules. In some cases, ontologies exist for modeling specific aspects or parts of a domain, thereby providing a unique semantics for that part. While an ontology captures the semantics of some domains, the problem remains to mediate across different ontologies for providing the user with an integrated view. Again a powerful integration language like F-logic is needed for mediating between the ontologies.

EXAMPLE 7.4.2

KIND Modules

The source modules of the KIND architecture, i.e., data and knowledge sources, have an associated XML DTD (Document Type Definition) describing the structure of the exported data after wrapping. Here, we speak of a data source (or data module), when the modeled information has mainly observational character like data collected during an experiment, and of a knowledge source when we model information about the application domain ("general" or "expert knowledge"), usually in rule form. Note that for some sources wrapping may be done once and off-line. However, often this translation has to be done online (or on-demand), i.e., the wrapper has to translate incoming XML queries to native queries against the actual source data. In general, the query capabilities of the underlying source are limited in which case the wrapper can support only specific XML queries.

Syntactic integration with some minimal consistency at the source level is achieved by enforcing that a source module M exports valid XML, i.e., which conforms to the associated DTD(M). Clearly, additional integrity constraints dealing with both structural aspects and application domain constraints should be modeled in order to guarantee consistency at a higher, conceptual level.

EXAMPLE 7.4.3

Exported Object and Class Structure

At the level of a source module M, we incorporate F-logic by providing a class signature $\Sigma(M)$ of exported classes and their objects' structure, which constitutes a semantically much richer conceptual-level specification of the source than just DTD(M) and thereby facilitates the integration of M at a conceptual level at the mediator. In particular, $\Sigma(M)$ specifies:
the source's class hierarchy,
whether attributes (i.e., F-logic methods) are single-valued or multi-valued,
whether and how they are parameterized, and
whether they are inheritable or not.

Formally, the object-oriented class structure of M is given by a mapping $\Phi_M$: DTD(M)→$\Sigma(M)$. Technically, $\Phi_M$ is straightforward to implement as it amounts to a simple syntactic transformation from XML elements to F-logic expressions (e.g., using an XML parser whose output is "pretty-printed" to F-logic, or using the XML stylesheet/transformation language XSL(T)). The difficulty consists in choosing the most appropriate "semantically adequate" representation in F-logic of the underlying, XML-encoded, object model.

Consider, for example, a generic mapping $\Phi_{GEN}$ which maps arbitrary XML documents (i.e., irrespective of an object model of the encoded information) to F-logic representations: Since an XML document is a semistructured database (more precisely, a labeled ordered tree) it can be represented in F-logic, for example, over the signature XML node:
[element_type⇒string;
attribute@(string)⇒string;
child@(integer)⇒xml_node].

While $\Phi_{GEN}$ faithfully represents any given XML document, the application domain structure is not visible at the schema level and has to be extracted from the data. Thus, whenever possible, it is preferable to model a source by first specifying its application domain structure in F-logic, i.e., designing $\Sigma(M)$. Then a syntactic representation of $\Sigma(M)$ using an XML DTD is straightforward, and we can trivially go back from that DTD to $\Sigma(M)$. Hence we get $\Phi_M$ essentially "for free".

In case a source module does not have an F-logic signature $\Sigma(M)$, for example, because M is a new source module being added to the system and DTD(M) is unknown, or $\Phi_M$ has not yet been established, then $\Phi_{GEN}$ can still be useful as a first means to bring the new data into the system. Indeed, F-logic is also suitable as a language for managing semistructured data, i.e., extracting data using generalized path expressions, discovering schema etc.

EXAMPLE 7.4.4

Exported Integrity Constraints

In addition to $\Sigma(M)$, a set of application specific integrity constraints IC(M) can be provided. These are F-logic rules that create "alerter objects", i.e., instances of class alert whenever an inconsistency (at the class or object level) is derived. An alerter object indicates the type of inconsistency encountered and some hints on which objects and classes were involved in the inconsistency which greatly simplifies debugging the data. In particular, this allows to differentiate between local inconsistencies (i.e., within a module M) and global inconsistencies.

EXAMPLE 7.4.5

Derived Knowledge

Finally, some modules M also export intensional knowledge in the form of a set of F-logic rules IDB(M).

EXAMPLE 7.4.6

ANATOM Fragment Cont'd

The anatomical knowledge base ANATOM referenced above includes the following rules:
purkinje_cell[located_in→→{purkinje_cell_layer}].
basket_cell[located_in→→{cerebellar cortex}].
X[located_in→→C]IF
X: nucleus[located_in→→{N: neuron}],
N[compartments→→{C: cell_body}].
X[located_in→→{X}]IF X: neuro_anatomic_entity.
Y[located_in→→{X}]IF X[has@(P)→→{Y}].
X[located_in→→{Y}]IF X..located_in..located_in=Y.

defining the located_in relation from base facts, specific anatomical knowledge rules, and generic rules for defining reflexive and transitive closure.

EXAMPLE 7.4.7

The KIND Mediator

As explained above, the structure and semantic information of a source module M is specified using an XML DTD (M) (mainly for inputting the wrapped raw data), a class signature $\Sigma(M)$, the correspondence mapping $\Phi_M$ between them, integrity constraints IC(M) and, in the case of derived knowledge, IDB(M). The KIND mediator module itself exports an integrated F-logic view INSM (Integrated Neuro-ScienceModel) to the user, which is defined based on the imported source modules (STUDIES, TAXON, . . . ), the facts and rules from the imported knowledge bases (ANATOM, ICORR), and the actual view-defining integration rules. The mediator imports signatures of a module M using declarations like:
import study[id⇒string; projec⇒string; experiments⇒experiment; . . .]from 'STUDIES'.

In this way, a subgoal of the form S: study[id→I; project→P; . . . ] induces a query against the STUDIES source. Note that oids of objects from different source modules M1 and M2 are guaranteed to be distinct. The declarative way to achieve this is by qualifying each oid with the URI of the module from which it was imported (in the implementation we can just use disjoint sets of integers as oids). The only oids which can be shared across modules are those of string objects and constants occurring in the import declaration. For example, consider two sources SIMPLE and DETAILED of animal data. We can simultaneously import from both modules as follows:
:—import animal[name⇒string] from 'SIMPLE'.
:—import animal[common name⇒string; species⇒string;
genus⇒string; . . . ] from 'DETAILED'.

Constants appearing in the import declarations (animal, species, :::) and string-valued objects like "Rodentia" are distinguished and thus shared external object names. Therefore a subgoal of the form X: animal[Attr→Val] will yield both, instance from SIMPLE and from DETAILED, together with their attribute/value pairs. As part of the integration process, we may have to distinguish between instances of animal from SIMPLE and those from DETAILED (note that the way internal oids are differentiated may not be visible to the rule programmer).

This is accomplished by qualifying names with the module they were important from: e.g., X: C"DETAILED".animal)[M→R] will only range over objects from DETAILED. Logically, this corresponds to defining for each module M, the methods M.N for all distinguished names imported from M:
M[N→M.N]IF N: distinguished name [imported_from→M].

When importing data from M, a distinguished (exported) class name C is prefixed with M and all instances of C in M are made instances of M.C.

EXAMPLE 7.4.8

F-Logic Query Evaluation

The invention embodiment of Example 7's KIND program and method uses a central mediator component with FLORA, an F-logic to XSB-Prolog compiler, as the evaluation engine. More information regarding FLORA may be had at "FLORA: The Secret of Object Oriented Logic Programming", Ludascher, Yang and Kifer; Techincal Report, State University of New York, Stony Brook, June 1999, incorporated herein by reference. Due to its built-in top-down strategy, FLORA derives facts in a demand-driven way somewhat similar to the VXD architecture of $MIX_m$. At the current implementation stage, sources have no independent query evaluation mechanism but simply export all data and rules to the central mediator. However, the design of the architecture allows for source modules to have their own evaluation engine in which case source data is imported only as needed for answering queries.

In contrast, the FLORID system is an implementation of F-logic which employs a bottom-up and thus a model materialization strategy. More information regarding FLORID may be had at "Managing Semi-structured Data with FLORID: A Deductive Object-Oriented Perspective", Ludascher, Himmeroder, Lausen, May, and Schlepphorst; Information Systems, 23(8):589-613, 1998; herein incorporated by reference. It has been shown that FLORID is well-suited for management of semistructured data and as a unified framework for wrapping and mediating Web data. Therefore, it may be desirable to incorporate the FLORID engine into the KIND architecture for modules and views where materialization is advantageous.

EXAMPLE 7.5

Elements of the Integrated Neuroscience Model

In this section concepts described in the previous section are illustrated by examples.

EXAMPLE 7.5.1

XML-DTD and F-logic Representations

Each source module M has an associated XML DTD. The XML data may result from wrapping of the raw data, or the source may natively support XML. The mediator can either import the XML DTD as is (using the generic mapping_M to F-logic), in which case any application specific structure not visible from the DTD has to be "re-covered" at the mediator, or the mediator can import the semantically richer F-logic signature.

The following XML DTD is used by the STUDIES database:

```
<!ELEMENT Studies (Study)*>
<!ELEMENT Study (study_id, project_name,
    project_description, animal, experiments, experimenters)>
<!ELEMENT animal (subject_id, scientific_name, strain, age)>
<!ELEMENT experiments (experiment)*>
<!ELEMENT experiment (description, instrument, parameters)>
<!ELEMENT instrument (type, name)>
<!ELEMENT parameters (parameter)*>
<!ELEMENT parameter (name, value)>
<!ELEMENT experimenters (experimenter)*>
<!ELEMENT experimenter (name, affiliation)>
```

One of many ways to model this in F-logic is as follows:
studyDB[studies⇒study].
study[id⇒string; project name⇒string; description⇒string;
animal⇒animal; experiments⇒experiment; experimenters⇒string].
animal[subject id⇒string; scientific name⇒string; strain⇒string;
age⇒string].
experiment[description⇒string; instrument⇒instrument; parameters⇒exp_parameter].
instrument[type⇒string; name⇒string].
exp parameter[name⇒string; value⇒string].

In general, the F-logic signature $\Sigma(M)$ can carry much more semantic information from the application domain (due to class hierarchies, parameterized methods, single- vs. multi-valued, etc.), in particular when accompanied by integrity constraints IC(M) and derived knowledge IDB(M).

EXAMPLE 7.5.2

Creation of Mediated Classes

At the mediator level, the F-logic schema of the source is modified to relate it to the knowledge sources. For example, the type of scientific name, which consists of genus and species names and may optionally include a subspecies name, is modified from a string to a taxon reference, where a taxon is an element from the taxonomic database. The modification is made by first creating a new class called animal at the mediator as the union of the classes called animal at the sources. Thus, at the mediator
animal[M⇒R]IF S: source, S.animal[M⇒R].
Then a new method is added to this union class to link it to the taxonomic database:
animal[taxon⇒'TAXON'.taxon].
Finally, the association between the scientic name in the PROLAB database and the taxonomic database is created:
X[taxon→T]IF: 'PROLAB'.animal[scientific_name→N], words(N,[W1,W2j]), T: 'TAXON'.taxon[genus→W1; species→W2].

The built-in predicate words, when given a string as first argument, returns the list of words of that string. As will be used later, this predicate can also create a string of words which are separated by a whitespace. Such somewhat "procedural" predicates like word can easily be defined at the mediator, since the whole XSB-Prolog machinery is accessible from the FLORA F-logic engine.

EXAMPLE 7.5.3

Geometric Modeling

In modeling reconstructed volumes of dendritic spines 17, we first create a number of solid-geometric primitives called shape 3D like cylinders, spheres and hyperboloids, used by solid modeling software.
shape3D[volume⇒scalar; area⇒scalar]
cylinder:: shape3D[radius⇒scalar; length⇒scalar].
The model of dendritic spines is composed of these primitives:
spine:: shape3D[view files⇒url].
mushroom spine:: spine[head⇒head; tape⇒taper; neck⇒neck].
head[shape⇒sphere]. taper[shape⇒hyperboloid].
neck[shape⇒cylinder].
The view files attribute yields a list of urls that represent the images of different projections of the 3D volume. A parametric attribute of F-logic is used to model spines protruding out from the shaft of a dendrite at a coordinate (x,y,z):
shaft[connected spine@(x,y,z)⇒spine; num spines⇒integer].

EXAMPLE 7.5.4

Rules for Classification and Integrity

The dendritic spines are classified into thin, stubby and mush-room classes using F-logic rules:
S: mushroom spine IF S: spine[head→_; neck→_; taper→_].
S: stubby spine IF S: spine[head→_; undef→→{neck, taper}].
S: thin spine IF S: spine[neck→_; undef→→{head, taper}].

The method undef applied to an object O yields those methods M that are declared for class C but which are not defined for O. This is a simple example for reasoning about schema and is specified in F-logic as follows:

O[undef→→{M}]IF O: C[M→→_], not O[M→→_].

The dendritic reconstruction data source also has integrity constraint rules, defined as a special class called alert. For example, the constraint that a dendritic spine cannot have only a taper (but no head or neck) is modeled as:

ic1(S): alert[type→"singleton taper"; object→S]IF S: spine[taper→_; undef→→{head,neck}].

EXAMPLE 7.5.5

Complex Relationships

As mentioned earlier, experimental biological information often have complex semantic relationships. For example, two experiments in a single study in source A may be related in the following way. In the first experiment, the experimenters perform a protein labeling on the entire brain and record the result as a segmentable image. In the second experiment, they would like to investigate the protein labeling pattern of the heavily stained portions of the brain region called cerebellum. So they extract that part of the cerebellum (from an identical specimen) which showed heavy staining in the previous experiment, and produce a finer resolution image to identify the actual cells that took the heavy stain. Although these two images are related, the relationship cannot be modeled just by linking the second image to a segment of the first. In reality, the second image is related to any segment in the first specimen that satisfies the condition of being "heavily stained" and in the cerebellum. We model this by using named predicates.

Consider a fragment on the schema of the class image:
image[anatomical structures⇒anatomical structure].
anatomical structure[name⇒string; segments⇒segment].
segment[description⇒string; features⇒feature].

We consider the simple case where a feature is a single floating point number. Let us assume that the class protein_label_image:: image has only one feature called protein amount. In order to express that a segment is heavily stained we can specify a user-defined predicate has prop as follows:

has prop(I, heavily stained, S) IF S..features.protein amount>100.

meaning that segment S of image I has the property "heavily stained" if the staining intensity is greater than 100. We assume a relation derived with (P, $I_1$, $I_2$) that is instantiated every time a researcher creates a finer resolution image $I_2$ based upon some property P on a coarser resolution image $I_1$. Then the rule:

highlight_parent_segments($I_2$, S) IF derived with (P, $I_1$,$I_2$), $I_1$: protein label image, $I_1$[anatomical structures..segments→→{S}], has prop($I_2$,P,S).

can be used to encode the relationship between the two images. Used this way, the rule will produce all possible segments in $I_1$ that could have produced the image $I_2$. We could also use a rule with the same body to return all derived images from a given image.

EXAMPLE 7.5.6

Meta-Reasoning with Schema

The mediator performs meta-reasoning of the schema of TAXON to create a class hierarchy of animals. Consider the schema of TAXON:

taxon[subspecies⇒string; species⇒string; genus⇒string; family⇒string; order⇒string; infraclass⇒string; . . . . . . phylum⇒string; kingdom⇒string; superkingdom⇒string].

At the mediator, a hierarchy is defined for the taxonomic ranks:

subspecies:: species:: genus:: . . . :: kingdom:: superkingdom.

Now the data in the TAXON database is used to infer the taxonomic class hierarchy:

T: TR, TR:: TR1 IF T: 'TAXON'.taxon[Taxon Rank→TR; Taxon Rank1→TR1], Taxon Rank:: Taxon Rank1.

The rule states that given two taxon ranks, e.g., order and kingdom with data values rodentia and metazoa respectively, and given that kingdom is a subclass of class, then rodentia is a subclass of metazoa. In other words, from the data of TAXON we infer new schema information, i.e., that all rodents belong to the metazoe kingdom. As we will show in the next section, this rule will be used in a query to determine the appropriate taxonomic ranks for computing joins and closures.

EXAMPLE 7.5.7

Rule Export from Knowledge Bases

Knowledge bases export rules to the mediator. The anatomical knowledge base, for example, contains both an "is a" and a "has a" hierarchy. Thus a Purkinje cell "is a" neuron and cerebellum "has a" Purkinje cell layer. We also use the predicate "located in" as an inverse of the "has a" relation. Thus the fact that Purkinje cell is "located in" Purkinje cell layer implies it is also "located in" the cerebellum. This rule is used in the mediator to create a transitive closure over the locations of neuro anatomic entity(ies) during a query.

EXAMPLE 7.6

Semantic Integration from the Mediator's and User's Perspective

To illustrate how an integrated query is evaluated in the Integrated Neuroscience Model embodiment of the invention, we trace through the phases of evaluating the first example query:

(1) Find the cerebellar distribution of all rat proteins with more than 90% amino acid homology with the humanNCS-1 protein.

The broad steps for evaluating this query in the INSM module are: (i) retrieve facts about shared homologies where homology>90% (uses CAPROT), (ii) determine the protein distribution using data from PROLAB and ANATOM, and (iii) compute the aggregate, grouped by anatomical structure.

More precisely, let us assume that the mediator defines and exports the following two views called homologous_proteins and aggregated_protein_distribution. The first can be treated as a relation:

Homologous_proteins(Protein1, Animal1, Protein2, Animal2, Name_type, Value)

Here the two protein-animal pairs refer to the variety of the specified protein as found in the given animal. This relation depicts that given two such pairs, the database stores how similar they are in terms of their amino acid sequence as a percentage value. The attribute name type specifies whether the common name or the scientific name of the animals have been specified in the query 20. Similarly, the second view can be treated as the relation aggregated_protein_distribution (Protein, Organism name, Name_type, Brain_region, Feature_name, Anatom_struct, Result)

The relation records the distribution of a feature (such as protein amount) of proteins occurring in the brain region of an organism, grouped by the anatomical structures in that brain region. The user's query is expressed in terms of these views in the following manner.

```
query1(Anatom struct, Result) IF homologous proteins("NCS-1",
    "human", Rat Protein, "house rat", common, Value),
    Value > 90,
    aggregated protein distribution(Rat Protein, "house rat", common,
        "cerebellum", "protein amount", Anatom struct, Result).
```

In the mediator the first view homologous proteins is constructed by importing from module CAPROT the class amino acid homology. The view definition of homologous proteins based on amino acid homology is:

```
homologous proteins(Protein1, Animal1, Protein2, Animal2, Name type,
    Value) IF
        :_amino acid homology[shared@(
            _: protein in animal[
                name!Protein1;
                found in→_: animal[
                    name@(Name type)→Animal1]],
            _: protein in animal[name→Protein2;
                found in→ : animal[
                    name@(Name type)→Animal2]])
        →Value].
```

Note that since this entire view is in the scope of one source module we do not need to qualify names by the module name. The definition of the second view illustrates the use of aggregation (here: summation of Values, grouped by Anatom struct):

```
aggregated protein distribution(
    Protein, Organism name, Name type, Brain region, Feature name,
    Anatom struct, Result) IF
        Result = sum{Value [Anatom_struct];
            protein_distribution(Protein, Organism_name
                Name_type, Brain_region, Feature_name,
                Anatom_struct, Value)}.
```

Here the view protein distribution is defined by importing the protein label image class of module PROLAB and the class neuro anatomic entity class of module ANATOM. Finally, a semantic join based on the ANATOM knowledge base is illustrated by the following rule:

```
protein_distribution(Protein, Organism_name, Name_type,
    Brain_region, Feature_name, Anatom_struct, Value) IF
    I:'PROLAB'.protein label image[proteins→→Protein; organism@(
        Name_type)→Organism_name; anatomical_structures→→
        {A:'PROLAB'.anatomical_structure[name→Anatom_name]}],
    NAE: 'ANATOM'.neuro_anatomic_entity[name→Anatom_name;
        located_in→→{Brain_region}],
    A..segments..features[name→Feature_name; value→Value].
```

In this view-definition rule the last two arguments of protein distribution are used as output variables while the rest are used as input variables. The anatomical structure from the PROLAB and ANATOM modules are explicitly joined using the variable Anatom name. As explained before, the recursive definition of located in in the ANATOM module, causes the rule to transitively traverse every substructure of the cerebellum down to the cellular level in order to find the "leaf level" anatomic structures where the protein is localized. This constitutes the semantic join between Brain region and the anatomical structure A whose features are being extracted.

(2) Compare this with the distribution of this protein or itshomologs in other rodents.

The primary difference between this query and the previous one is that it is executed over the set of all rodents except rat, and that it uses information from the module TAXON. With this modification, the second query is stated as:

```
query2(Anatom_struct, Result) IF homologous_proteins("NCS-1",
    "Homo sapiens",Rodent_Protein, Rodent_name, scientific, Value), :
        'TAXON'.taxon[order→"Rodentia"; genus→G; species→S ],
    words(Rodent_name, [G,S]), Scientific name = \ = "Rattus rattus",
    Value > 90,
        aggregated_protein_distribution(Rat Protein, "house rat",
            common, "cerebellum", "protein_amount",
            Anatom_struct, Result).
```

In this query we use the scientific rather than the common names of organisms, and we explicitly use the information that "Rodentia" is a value of the order attribute of the class taxon. This directly collects all known rodents in a set over which the rest of the query is evaluated. A less straightforward (but perhaps easier for the less knowledgeable user) way of evaluating the query could be to walk the transitive relationship of taxonomic classes to discover that we need all species under the order "Rodentia". Also note that the species "*Rattus rattus*" has been explicitly eliminated from the set to compute the rest of the aggregated protein distributions.

Those knowledgeable in the art will appreciate that the invention as claimed in the claims appended hereto is not limited to the embodiments described and discussed herein, and that many equivalent elements and steps may be substituted for those used herein. For example, many equivalents to the particular languages used herein such as XML, F-logic, RDF, UML, EER, and the like are of course possible. Also, the invention is not limited to practice on databases, but is instead able to be practiced with any of a variety of data sources that can be queried, with examples including, but not limited to, databases, tables, spreadsheets, forms, web pages with forms, flat files, software with API's (application program interfaces), and the like. The invention is also not limited to practice with any particular number of data sources. Indeed, although examples herein have referred to practice with two or three data sources, those knowledgeable in the art will appreciate that the invention may be practiced with multiplicities of different data sources.

The present invention thereby provides a novel and elegant solution to problems that were heretofore unresolved. An embodiment of the invention generally comprises integrating data sources at a "knowledge" or "conceptual" level that sits above the "structural level". The higher level integration allows for deeper and richer relations between data sources to be manipulated for resolving queries. Also, an invention embodiment provides a highly extendable architecture allowing for easy addition of data sources to the integration regardless of the source's formalism through use of a generic conceptual model and "plug ins" for converting between the source's formalism and the generic model formalism. Still further, an invention embodiment allows for responsive data to be presented in context by displaying not only the data but also the logic relations that were made to relate classes in obtaining the data.

The advantages of the disclosed invention are thus attained in an economical, practical, and facile manner. While preferred embodiments and example configurations have been shown and described, it is to be understood that various further modifications and additional configurations will be apparent to those skilled in the art. It is intended that the class specific embodiments and configurations herein disclosed are illustrative of the preferred and best modes for practicing the invention, and should not be interpreted as limitations on the scope of the invention as defined by the appended claims.

What is claimed is:

1. A method for integrating a plurality of data sources comprising the steps of:
    obtaining semantic information from each of the plurality of data sources;
    creating a conceptual model for each of the plurality of data sources using said semantic information;
    accessing a secondary knowledge source having information that relates the different data sources;
    creating an integrated semantic model of the plurality of data sources using said conceptual models and said secondary knowledge source;
    wherein said semantic information comprises characterization of at least one of constraints that hold for subsets of data in the plurality of data sources and relationships that hold between the data;
    wherein said semantic information further comprises information expressing properties of the data that have not been explicitly encoded in an alphanumeric representation of the data or in a syntactic structure that holds together different data elements.

2. A method as in claim 1 wherein each of said conceptual models is in a uniform language.

3. A method as in claim 1 wherein each of the plurality of data sources has a semantic formalism, and wherein the method further comprises providing a plug-in for converting at least one of the plurality of data source's semantic formalism to said uniform language of said generic conceptual model.

4. A method as in claim 1 wherein said semantic information obtained from at least one of the plurality of data sources is expressed in one of either a unified modeling language, resource description framework, or an extended entity relationship language.

5. A method as in claim 1 wherein the step of creating a conceptual model for each of the plurality of databases further comprises converting each of said conceptual models into a generic conceptual model, each of said generic conceptual models being in a uniform language.

6. A method as in claim 5 wherein said uniform language represents logic statements.

7. A method as in claim 5 wherein the step of creating said integrated semantic model comprises using said generic conceptual models.

8. A method as in claim 1 wherein each of said conceptual models created from each of the plurality of data sources comprise logic statements, and wherein said integrated semantic model comprises logic statements.

9. A method as in claim 1 wherein said secondary knowledge source comprises logic statements in a frame logic language.

10. A method as in claim 1 wherein said integrated semantic model comprises logic statements, and wherein at least one of said logic statements comprises an instance declaration, at least one of said logic statements comprises a subclass declaration, and at least one of said logic statements comprises a method declaration.

11. A method as in claim 1 wherein said secondary knowledge source comprises a plurality of secondary knowledge sources.

12. A method as in claim 1 wherein each of the conceptual models from each of the plurality of data sources have at least a class, said semantic information comprises as least a class schema, and wherein said integrated semantic model comprises logic statements that define one of at least an instance, subclass, or method relation between at least a first class from one of the plurality of data sources and a second class from a second of the plurality of data sources.

13. A method as in claim 1 wherein each of said conceptual models has at least a class, said semantic information comprises a class schema, and wherein said integrated semantic model comprises logic statements that define an instance, subclass, and a method relation between one or more classes from a first of the plurality of data sources and one or more classes from others of the plurality of data sources.

14. A method as in claim 1 wherein each of said conceptual models has at least a class, and wherein said integrated semantic model comprises at least a logic statement that defines one of an "is a", "has a", or a "part of" relation between at least a first class from one of the plurality of data sources and one or more classes from others of the plurality of data sources.

15. A method as in claim 1 wherein said secondary knowledge source comprises expert knowledge.

16. A method as in claim 1 wherein each of the plurality of data sources define at least a class, and wherein said secondary knowledge source has information comprising rules that relate at least some of the classes from different of the plurality of data sources to one another.

17. A method as in claim 16 wherein said rules relate at least a first class from one of the plurality of data sources to one or more second classes from others of the plurality of data sources in a logical instance, subclass, or method relation.

18. A method as in claim 1 wherein said secondary knowledge source information is not available from any of the plurality of data sources.

19. A method as in claim 1 wherein said method further comprises converting data from each of the plurality of data sources into a uniform language.

20. A method as in claim 19 wherein said uniform language comprises extensible markup language.

21. A method as in claim 1 wherein the method further comprises processing a user-input query against said integrated semantic model to identify data from one or more of the plurality of data sources responsive to said query.

22. A method as in claim 21 wherein each of the plurality of data sources comprises at least a data class, and wherein in responding to said query the method further comprises the steps of:
    logically relating one or more classes from different of the plurality of databases to one another; and
    presenting said data responsive to the query in context by displaying said logic relations made between said related classes.

23. A computer program for integrating a plurality of different data sources, the computer program comprising computer executable instructions stored in a computer readable medium that when executed cause the computer to:
    obtain semantic information from each of the plurality of data sources;

create a conceptual model for each of the plurality of data sources using said semantic information;

access a secondary knowledge source having information relating the data sources to one another; and create an integrated semantic model using said conceptual models and said secondary knowledge source;

wherein said semantic information comprises characterization of at least one of constraints that hold for subsets of data in the plurality of data sources and relationships that hold between the data;

wherein said semantic information further comprises information expressing properties of the data that have not been explicitly encoded in an alphanumeric representation of the data or in a syntactic structure that holds together different data elements.

24. A computer program as in claim 23 wherein each of said conceptual models comprises a generic conceptual model in a uniform language.

25. A computer program as in claim 24 wherein each of said generic conceptual models comprise logic statements, and wherein said integrated semantic model comprises logic statements.

26. A computer program product as in claim 24 wherein the computer program instructions when executed further cause the computer to provide a plug-in for converting between one of the plurality of data source's semantic formalism and said uniform language of said generic conceptual model.

27. A computer program as in claim 23 wherein said semantic information obtained from at least one of the plurality of data sources is expressed in one of either a unified modeling language, resource description framework, or an extended entity relationship language.

28. A computer program as in claim 23 wherein said semantic information comprises class schema and relationship schema.

29. A computer program as in claim 23 wherein each of the plurality of databases has at least a class, and wherein said integrated semantic model comprises logic statements relating at least some of said classes from different of the data sources to one another.

30. A computer program as in claim 29 wherein said logic statements comprise Frame logic.

31. A computer program as in claim 23 wherein said integrated semantic model comprises logic statements relating classes of data from different of the plurality of databases to one another, and wherein at least one of said logic statements comprises an instance declaration, at least one of said logic statements comprises a subclass declaration, and at least one of said logic statements comprises a method declaration.

32. A computer program as in claim 23 wherein each of the plurality of data sources has at least a class, and wherein said integrated semantic model comprises logic statements that express an instance, a subclass, and a method relation between at least one class from a first of the plurality of databases and one or more classes from others of the plurality of databases.

33. A computer program as in claim 23 wherein each of said conceptual models comprises a class hierarchy having at least a class and a subclass.

34. A computer program as in claim 23 wherein said secondary knowledge source comprises expert knowledge.

35. A computer program as in claim 23 wherein said secondary knowledge source comprises a digital data file.

36. A computer program as in claim 23 wherein said secondary knowledge source comprises a plurality of secondary knowledge sources.

37. A computer program as in claim 23 wherein each of the plurality of data sources define at least a class, and wherein said secondary knowledge source has information relating at least some of the classes from different of the plurality of data sources to one another.

38. A computer program as in claim 23 wherein said secondary knowledge source information relates at least a first class from one of the plurality of data sources in one of an instance, sub-class, or method relation to a second class from another of the plurality of databases.

39. A method as in claim 23 wherein said secondary knowledge source information is not available from any of the plurality of databases.

40. A computer program product as in claim 23 wherein the program instructions when executed cause the computer to convert data from each of the plurality of data sources into a uniform language.

41. A computer program product as in claim 40 wherein said uniform data language comprises a semistructured language.

42. A computer program product as in claim 41 wherein said uniform language comprises extensible markup language.

43. A computer program product as in claim 23 wherein the computer program instructions when executed cause the computer to process a user-input query and to use said integrated semantic model to identify data from one or more of the plurality of data sources responsive to said query.

44. A computer program product as in claim 43 wherein the computer program instructions further cause the computer to display said data responsive to said query in context by displaying logic relations made between classes from different of the plurality of data sources to identify said responsive data.

45. A method for integrating a plurality of data sources comprising the steps of:

obtaining semantic information from each of the plurality of data sources, wherein said semantic information comprises characterization of at least one of constraints that hold for subsets of data in the plurality of data sources and relationships that hold between the data, wherein said obtained semantic information further expresses properties of the data that have not been explicitly encoded in an alphanumeric representation of the data or in the syntactic structure that holds together different data elements;

creating a conceptual model for each of the plurality of data sources using said semantic information;

accessing a secondary knowledge source having information that relates the different data sources;

creating an integrated semantic model of the plurality of data sources using said conceptual models and said secondary knowledge source.

46. The method of claim 45, wherein said created conceptual model expresses said obtained semantic information;

wherein said obtained semantic information is not available on a face of the data source.

47. The method of claim 46, wherein the information accessed from said accessing a secondary knowledge source relates the plurality of data sources to one another.

48. The method of claim 46, wherein said created integrated semantic model comprises a conceptual level model that relates data from the plurality of data sources.

* * * * *